United States Patent
Lim et al.

(10) Patent No.: US 11,509,930 B2
(45) Date of Patent: Nov. 22, 2022

(54) IMAGE ENCODING/DECODING METHOD AND RECORDING MEDIUM THEREFOR

(71) Applicant: Electronics and Telecommunications Research Institute, Daejeon (KR)

(72) Inventors: Sung Chang Lim, Daejeon (KR); Jung Won Kang, Daejeon (KR); Hyun Suk Ko, Daejeon (KR); Ha Hyun Lee, Seoul (KR); Dong San Jun, Daejeon (KR); Jin Ho Lee, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/301,318

(22) PCT Filed: Jul. 12, 2017

(86) PCT No.: PCT/KR2017/007481
§ 371 (c)(1),
(2) Date: Nov. 13, 2018

(87) PCT Pub. No.: WO2018/012886
PCT Pub. Date: Jan. 18, 2018

(65) Prior Publication Data
US 2019/0200040 A1    Jun. 27, 2019

(30) Foreign Application Priority Data

Jul. 12, 2016  (KR) .................. 10-2016-0088250

(51) Int. Cl.
*H04N 19/583* (2014.01)
*H04N 19/51* (2014.01)
(Continued)

(52) U.S. Cl.
CPC ......... *H04N 19/583* (2014.11); *H04N 19/105* (2014.11); *H04N 19/176* (2014.11);
(Continued)

(58) Field of Classification Search
CPC .. H04N 19/583; H04N 19/105; H04N 19/176; H04N 19/51; H04N 19/96;
(Continued)

(56) References Cited

U.S. PATENT DOCUMENTS

| 10,986,358 B2 * | 4/2021 | Lee ....................... H04N 19/51 |
| 2011/0200098 A1 * | 8/2011 | Kim ..................... H04N 19/567 |
| | | 375/240.02 |

(Continued)

FOREIGN PATENT DOCUMENTS

| JP | 2007-525908 A | 9/2007 |
| JP | 2012-253459 A | 12/2012 |

(Continued)

OTHER PUBLICATIONS

International Search Report dated Oct. 24, 2017, in corresponding International Application No. PCT/KR2017/007481 (2 pages in English, 2 pages in Korean).

(Continued)

*Primary Examiner* — Hesham K Abouzahra
(74) *Attorney, Agent, or Firm* — NSIP Law

(57) ABSTRACT

The present invention relates to a method for encoding/decoding a video. To this end, the method for decoding a video may include: generating a merge candidate list of a current block including at least one merge candidate corresponding to each of a plurality of reference picture lists; determining at least one piece of motion information by using the merge candidate list; and generating a prediction block of the current block by using the determined at least one one piece of motion information.

11 Claims, 26 Drawing Sheets

(51) Int. Cl.
  *H04N 19/105* (2014.01)
  *H04N 19/176* (2014.01)
  *H04N 19/96* (2014.01)
  *H04N 19/132* (2014.01)
  *H04N 19/577* (2014.01)
  *H04N 19/196* (2014.01)
  *H04N 19/513* (2014.01)
  *H04N 19/463* (2014.01)
  *H04N 19/56* (2014.01)

(52) U.S. Cl.
  CPC ............ *H04N 19/51* (2014.11); *H04N 19/96* (2014.11); *H04N 19/132* (2014.11); *H04N 19/197* (2014.11); *H04N 19/463* (2014.11); *H04N 19/513* (2014.11); *H04N 19/56* (2014.11); *H04N 19/577* (2014.11)

(58) Field of Classification Search
  CPC .. H04N 19/132; H04N 19/197; H04N 19/463; H04N 19/513; H04N 19/56; H04N 19/577
  See application file for complete search history.

(56) References Cited

U.S. PATENT DOCUMENTS

| | | |
|---|---|---|
| 2012/0243609 A1 | 9/2012 | Zheng et al. |
| 2013/0114699 A1 | 5/2013 | Kim et al. |
| 2014/0253681 A1* | 9/2014 | Zhang .................. H04N 19/513 348/43 |
| 2014/0301461 A1* | 10/2014 | Jeon ..................... H04N 19/159 375/240.12 |
| 2015/0003529 A1 | 1/2015 | Thirumalai et al. |
| 2015/0085932 A1* | 3/2015 | Lin ...................... H04N 13/161 375/240.16 |
| 2015/0103897 A1 | 4/2015 | Kim et al. |
| 2019/0149836 A1* | 5/2019 | Moon .................. H04N 19/513 375/240.16 |
| 2021/0195185 A1* | 6/2021 | Raut .................... H04N 19/105 |

FOREIGN PATENT DOCUMENTS

| | | |
|---|---|---|
| JP | 2013-153422 A | 8/2013 |
| JP | 2014-529254 A | 10/2014 |
| KR | 10-0772576 B1 | 11/2007 |
| WO | WO 01/86962 A1 | 11/2001 |
| WO | WO 2013/036071 A2 | 3/2013 |
| WO | WO 2015/142054 A1 | 9/2015 |

OTHER PUBLICATIONS

Lim, Jaehyun et al., "Extended merging scheme using motion-hypothesis inter prediction", *Joint Collaborative Team on Video Coding (JCT-VC) of ITU-T SG16 WP3 and ISO/IEC JTC1/SC29/WG11* 2nd Meeting: Geneva, CH, Jul. 21-28, 2010 (pp. 1-7).

Chen, Chun-Chi et al., "CE2: Report of OBMC with Motion Merging", *Joint Collaborative Team on Video Coding (JCT-VC) of ITU-T SG16 WP3 and ISO/IEC JTC1/SC29/WG11,* 6th Meeting: Torino, IT, Jul. 14-22, 2011 (pp. 1-13).

Li, Muchen et al., "Low-complexity merge candidate decision for fast HEVC encoding." *2013 IEEE International Conference on Multimedia and Expo Workshops (ICMEW). IEEE,* 2013 (pp. 1-8).

Chen, Chun-Chi et al., "Generalized bi-prediction for inter coding", *Joint Collaborative Team on Video Coding (JCT-VC) of ITU-T SG16 WP3 and ISO/IEC JTC1/SC29/WG11,* 3rd Meeting: Geneva, CH, May 26-Jun. 1, 2016 (pp. 1-7).

* cited by examiner

FIG. 7

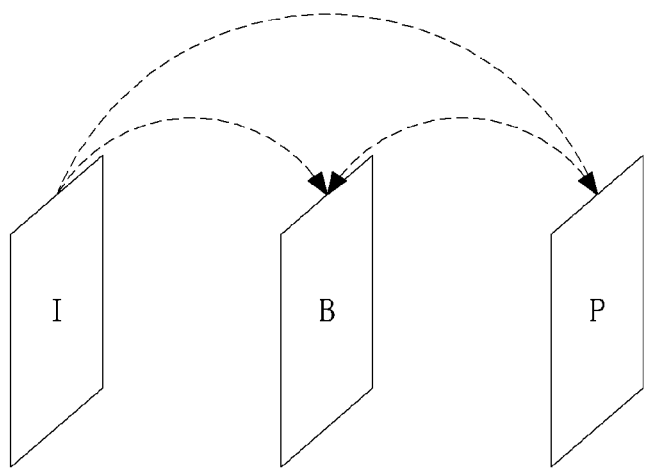

FIG.8

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

Diagonal          Horizontal          Vertical

FIG. 14

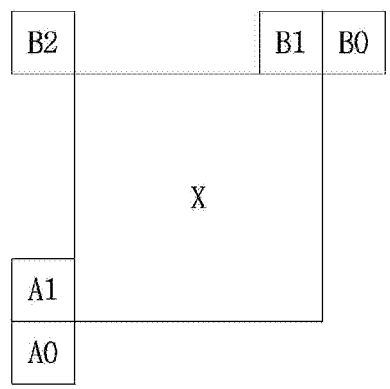

FIG. 15

| | when MaxNumMergeCand is 7 | | | | | | | | | | | | |
|---|---|---|---|---|---|---|---|---|---|---|---|---|---|
| merge candid ate index (merge _idx) | L0 motion information | | | L1 motion information | | | L2 motion information | | | L3 motion information | | | description |
| | moti on vecto r | refere nce pictur e index | predi ction list utiliz ation flag | moti on vecto r | refere nce pictur e index | predi ction list utiliz ation flag | moti on vecto r | refere nce pictur e index | predi ction list utiliz ation flag | moti on vecto r | refere nce pictur e index | predi ction list utiliz ation flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| ... | | | | | | | | | | | | | |
| | numMergeCand = 4 | | | | | | | | | | | | |

FIG. 18

| when MaxNumMergeCand is 7 | | | | | | | | | | | | | |
|---|---|---|---|---|---|---|---|---|---|---|---|---|---|
| merge candidate index (merge_idx) | L0 motion information | | | L1 motion information | | | L2 motion information | | | L3 motion information | | | description |
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| ... | | | | | | | | | | | | | |
| numMergeCand = 5 | | | | | | | | | | | | | |

FIG. 19

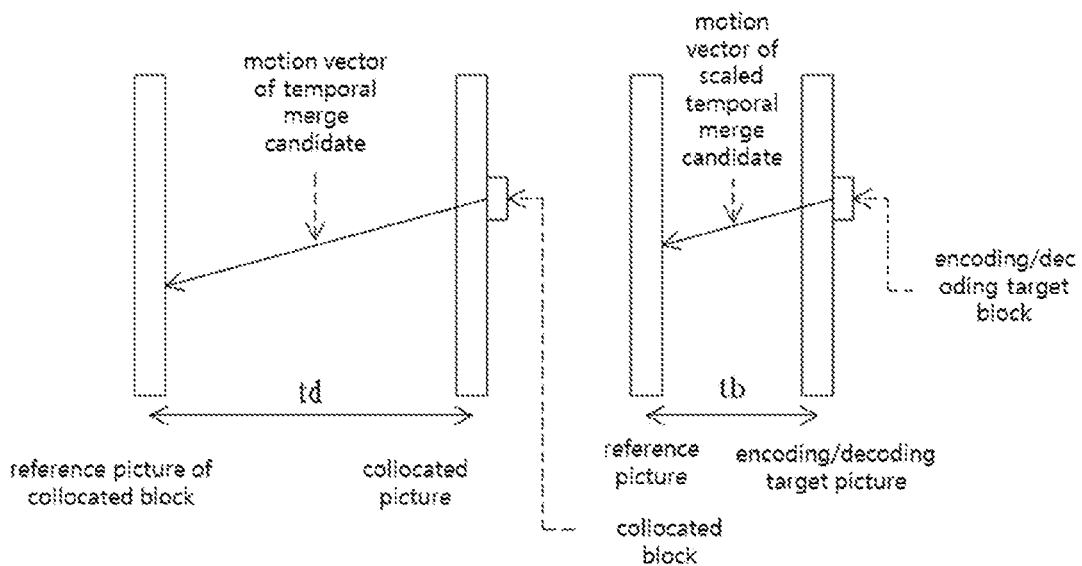

FIG. 22

| merge candidate index (merge_idx) | when MaxNumMergeCand is 7 ||||||||||||  description |
|---|---|---|---|---|---|---|---|---|---|---|---|---|---|
| | L0 motion information ||| L1 motion information ||| L2 motion information ||| L3 motion information ||| |
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| 5 | (3, 1) | 0 | 1 | (-3, 0) | 0 | 1 | (-7, 5) | 1 | 1 | - | - | 0 | combined merge candidate #1 |
| 6 | (-1, 5) | 1 | 1 | (-2, 0) | 0 | 1 | (-7, 5) | 1 | 1 | - | - | 0 | combined merge candidate #2 |
| numMergeCand = 7 |||||||||||||||

FIG. 23

| merge candidate index (merge_idx) | when MaxNumMergeCand is 7 ||||||||||||  description |
|---|---|---|---|---|---|---|---|---|---|---|---|---|---|
| | L0 motion information ||| L1 motion information ||| L2 motion information ||| L3 motion information ||| |
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (6, 2) | 0 | 1 | - | - | 0 | (-1, 2) | 0 | 1 | (-1, 3) | 1 | 0 | H temporal merge candidate |
| 3 | (3, 1) | 0 | 1 | (-3, 0) | 0 | 1 | (-7, 5) | 1 | 1 | - | - | 0 | combined merge candidate #1 |
| 4 | (-1, 5) | 1 | 1 | (-2, 0) | 0 | 1 | (-7, 5) | 1 | 1 | - | - | 0 | combined merge candidate #2 |
| ... |||||||||||||||
| numMergeCand = 5 |||||||||||||||

FIG. 27

| merge candidate index (merge_idx) | when MaxNumMergeCand is 8 ||||||||||||| description |
|---|---|---|---|---|---|---|---|---|---|---|---|---|---|
| | L0 motion information ||| L1 motion information ||| L2 motion information ||| L3 motion information ||| |
| | motion vector | reference picture index | prediction list utilization flag | motion vector | reference picture index | prediction list utilization flag | motion vector | reference picture index | prediction list utilization flag | motion vector | reference picture index | prediction list utilization flag | |
| 0 | (3, 1) | 0 | 1 | (-2, 0) | 0 | 1 | - | - | 0 | - | - | 0 | A1 spatial merge candidate |
| 1 | (-1, 5) | 1 | 1 | (-3, 0) | 0 | 1 | (-7, 5) | 1 | 1 | - | - | 0 | B0 spatial merge candidate |
| 2 | (3, 1) | 0 | 1 | - | - | 0 | (-1, 3) | 1 | 1 | (-1, 3) | 1 | 1 | A0 spatial merge candidate |
| 3 | (3, 1) | 0 | 1 | (-3, 0) | 0 | 1 | (-1, 2) | 1 | 1 | (-2, 3) | 2 | 1 | B2 spatial merge candidate |
| 4 | (6, 2) | 0 | 1 | - | - | 0 | (-1, 2) | 0 | 1 | (-1, 3) | 1 | 0 | H temporal merge candidate |
| 5 | (3, 1) | 0 | 1 | (-3, 0) | 0 | 1 | (-7, 5) | 1 | 1 | - | - | 0 | combined merge candidate #1 |
| 6 | (-1, 5) | 1 | 1 | (-2, 0) | 0 | 1 | (-7, 5) | 1 | 1 | - | - | 0 | combined merge candidate #2 |
| 7 | (0, 0) | 0 | 1 | (0, 0) | 0 | 1 | (0, 0) | 0 | 1 | (0, 0) | 0 | 1 | zero merge candidate |
| numMergeCand = 8 |||||||||||||| |

| coding_unit(x0,y0,log2CbSize) { | Descriptor |
|---|---|
| ... | |
| if(slice_type != I) | |
| cu_skip_flag[x0][y0] | ae(v) |
| nCbS = ( 1 << log2CbSize) | |
| if(cu_skip_flag[x0][y0]) | |
| prediction_unit(x0,y0,nCbS,nCbS) | |
| ... | |

FIG. 31

| | Descriptor |
|---|---|
| prediction_unit(x0,y0,nPbW,nPbH){ | |
| if(cu_skip_flag[x0][y0]){ | |
| if(MaxNumMergeCand>1) | |
| merge_idx[x0][y0] | ae(v) |
| }else{/* MODE_INTER */ | |
| merge_flag[x0][y0] | ae(v) |
| if(merge_flag[x0][y0]){ | |
| if(MaxNumMergeCand >1) | |
| merge_idx[x0][y0] | ae(v) |
| if(slice_type == B) | |
| inter_pred_idc[x0][y0] | ae(v) |
| if(inter_pred_idc[x0][y0] != PRED_L1){ | |
| wf_l0[x0][y0] | ae(v) |
| offset_l0[x0][y0] | ae(v) |
| } | |
| if(inter_pred_idc[x0][y0] != PRED_L0){ | |
| wf_l1[x0][y0] | ae(v) |
| offset_l1[x0][y0] | ae(v) |
| } | |
| if(inter_pred_idc[x0][y0] != PRED_BI && inter_pred_idc[x0][y0] != PRED_L0 && inter_pred_idc[x0][y0] != PRED_L1){ | |
| wf_l2[x0][y0] | ae(v) |
| offset_l2[x0][y0] | ae(v) |
| } | |
| if(inter_pred_idc[x0][y0] != PRED_BI && inter_pred_idc[x0][y0] != PRED_L0 && inter_pred_idc[x0][y0] != PRED_L1 && inter_pred_idc[x0][y0] != PRED_TRI){ | |
| wf_l3[x0][y0] | ae(v) |
| offset_l3[x0][y0] | ae(v) |
| } | |
| },... | | ns # IMAGE ENCODING/DECODING METHOD AND RECORDING MEDIUM THEREFOR

CROSS REFERENCE TO RELATED APPLICATION(S)

This application is a U.S. National Stage Application of International Application No. PCT/KR2017/007481, filed on Jul. 12, 2017, which claims the benefit under 35 USC 119(a) and 365(b) of Korean Patent Application No. 10-2016-0088250, filed on Jul. 12, 2016, in the Korean Intellectual Property Office.

TECHNICAL FIELD

The present invention relates to a method and apparatus for encoding/decoding a video. More particularly, the present invention relates to a method and apparatus for performing motion compensation by using a merge mode.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In motion compensation using a conventional merge mode, only a spatial merge candidate, a temporal merge candidate, a bi-prediction merge candidate, and a zero merge candidate are added to a merge candidate list to be used. Accordingly, only uni-directional prediction and bi-directional prediction are used, and thus there is a limit to enhance encoding efficiency.

In motion compensation using the conventional merge mode, there is a limit in throughput of the merge mode due to dependency between a temporal merge candidate derivation process and a bi-prediction merge candidate derivation process. Also, the merge candidate derivation processes may not be performed in parallel.

In motion compensation using the conventional merge mode, the bi-prediction merge candidate generated through the bi-prediction merge candidate derivation process is used as motion information. Thus, memory access bandwidth increases during motion compensation, compared to the uni-prediction merge candidate.

In motion compensation using the conventional merge mode, zero merge candidate derivation is differently performed according to a slice type, and thus hardware logic is complex. Also, a bi-prediction zero merge candidate is generated through a bi-prediction zero merge candidate derivation process to be used in motion compensation, and thus memory access bandwidth increases.

DISCLOSURE

Technical Problem

An object of the present invention is to provide a method and apparatus for performing motion compensation by using a combined merge candidate to enhance encoding/decoding efficiency of a video.

Another object of the present invention is to provide a method and apparatus for performing motion compensation by using uni-direction prediction, bi-directional prediction, tri-directional prediction, and quad-directional prediction to enhance encoding/decoding efficiency of a video.

Another object of the present invention is to provide a method and apparatus for determining motion information through parallelization of the merge candidate derivation processes, removal of dependency between the merge candidate derivation processes, bi-prediction merge candidate partitioning, and uni-prediction zero merge candidate derivation so as to increase throughput of the merge mode and to simplify hardware logic.

Technical Solution

A method for decoding a video according to the present invention includes: generating a merge candidate list of a current block including at least one merge candidate corresponding to each of a plurality of reference picture lists; determining at least one piece of motion information by using the merge candidate list; and generating a prediction block of the current block by using the determined at least one piece of motion information.

In the method for decoding a video, the merge candidate list may include at least one of a spatial merge candidate derived from a spatial neighbor block of the current block, a temporal merge candidate derived from a collocated block of the current block, a modified spatial merge candidate derived by modifying the spatial merge candidate, a modified temporal merge candidate derived by modifying the temporal merge candidate, and a merge candidate having a predefined motion information value.

In the method for decoding a video, the merge candidate list may further include a combined merge candidate derived by using at least two selected from a group consisting of the spatial merge candidate, the temporal merge candidate, the modified spatial merge candidate, and the modified temporal merge candidate.

In the method for decoding a video, the spatial merge candidate may be derived from a sub-block of a neighbor block adjacent to the current block, and the temporal merge candidate may be derived from a sub-block of the collocated block of the current block.

In the method for decoding a video, the generating of the prediction block of the current block by using the determined at least one piece of motion information may include: generating a plurality of temporary prediction blocks according to an inter-prediction indicator of the current block; and generating the prediction block of the current block by applying at least one of a weighting factor and an offset to the generated plurality of temporary prediction blocks.

In the method for decoding a video, at least one of the weighting factor and the offset may be shared in blocks that are smaller than a predetermined block in size or are deeper than the predetermined block in depth.

In the method for decoding a video, the merge candidate list may be shared in blocks that are smaller than a predetermined block in size or are deeper than the predetermined block in depth.

In the method for decoding a video, when the current block is smaller than a predetermined block in size or is deeper than the predetermined block in depth, the merge candidate list may be generated based on a higher block of the current block, the higher block being equal to the predetermined block in size or in depth.

A method for encoding a video according to the present invention includes: generating a merge candidate list of a current block including at least one merge candidate corresponding to each of a plurality of reference picture lists; determining at least one piece of motion information by using the merge candidate list; and generating a prediction block of the current block by using the determined at least one piece of motion information.

In the method for encoding a video, the merge candidate list may include at least one of a spatial merge candidate derived from a spatial neighbor block of the current block, a temporal merge candidate derived from a collocated block of the current block, a modified spatial merge candidate derived by modifying the spatial merge candidate, a modified temporal merge candidate derived by modifying the temporal merge candidate, and a merge candidate having a predetermined motion information value.

In the method for encoding a video, the merge candidate list may further include a combined merge candidate derived by using at least two selected from a group consisting of the spatial merge candidate, the temporal merge candidate, the modified spatial merge candidate, and the modified temporal merge candidate.

In the method for encoding a video, the spatial merge candidate may be derived from a sub-block of a neighbor block adjacent to the current block, and the temporal merge candidate may be derived from a sub-block of the collocated block of the current block.

In the method for encoding a video, the generating of the prediction block of the current block by using the determined at least one piece of motion information may include: generating a plurality of temporary prediction blocks according to an inter-prediction indicator of the current block; and generating the prediction block of the current block by applying at least one of a weighting factor and an offset to the generated plurality of temporary prediction blocks.

In the method for encoding a video, at least one of the weighting factor and the offset may be shared in blocks that are smaller than a predetermined block in size or are deeper than the predetermined block in depth.

In the method for encoding a video, the merge candidate list may be shared in blocks that are smaller than a predetermined block in size or are deeper than the predetermined block in depth.

In the method for encoding a video, when the current block is smaller than a predetermined block in size or is deeper than the predetermined block in depth, the merge candidate list may be generated based on a higher block of the current block, the higher block being equal to the predetermined block in size or in depth.

An apparatus for decoding a video according to the present invention includes an inter prediction unit that generates a merge candidate list of a current block including at least one merge candidate corresponding to each of a plurality of reference picture lists, determines at least one piece of motion information by using the merge candidate list, and generates a prediction block of the current block by using the determined at least one piece of motion information.

An apparatus for encoding a video according to the present invention includes an inter prediction unit that generates a merge candidate list of a current block including at least one merge candidate corresponding to each of a plurality of reference picture lists, determines at least one piece of motion information by using the merge candidate list, and generates a prediction block of the current block by using the determined at least one piece of motion information.

A readable medium according to the present invention stores a bitstream formed by a method for encoding a video, the method including: generating a merge candidate list of a current block including at least one merge candidate corresponding to each of a plurality of reference picture lists; determining at least one piece of motion information by using the merge candidate list; and generating a prediction block of the current block by using the determined at least one piece of motion information.

Advantageous Effects

In the present invention, provided is a method and apparatus for performing motion compensation by using a combined merge candidate to enhance encoding/decoding efficiency of a video.

In the present invention, provided is a method and apparatus for performing motion compensation by using uni-directional prediction, bi-directional prediction, tri-directional prediction, and quad-directional prediction to enhance encoding/decoding efficiency of a video.

In the present invention, provided is a method and apparatus for performing motion compensation through parallelization of merge candidate derivation processes, removal of dependency between the merge candidate derivation processes, bi-prediction merge candidate partitioning, and uni-prediction zero merge candidate derivation so as to increase throughput of a merge mode and to simplify hardware logic.

DESCRIPTION OF DRAWINGS

FIG. 7 is a view for explaining an embodiment of a process of inter prediction.

FIG. 8 is a view for explaining transform sets according to intra-prediction modes.

FIG. 14 is a view showing an example of deriving a spatial merge candidate of a current block.

FIG. 15 is a view showing an example of adding a spatial merge candidate to a merge candidate list.

FIG. 18 is a view showing an example of adding a temporal merge candidate to a merge candidate list.

FIG. 19 is a view showing an example of scaling a motion vector of a collocated block to derive a temporal merge candidate of a current block.

FIGS. 22 and 23 are views showing an embodiment of deriving a combined merge candidate by using at least one of a spatial merge candidate, a temporal merge candidate, and a zero merge candidate, and of adding the combined merge candidate to a merge candidate list.

FIG. 27 is a view showing an embodiment of adding the derived zero merge candidate to a merge candidate list.

FIG. 29 is a view showing an embodiment of deriving and sharing a merge candidate list in a CTU.

FIGS. 30 and 31 are views showing examples of syntax of information on motion compensation.

MODE FOR INVENTION

Figure 1:
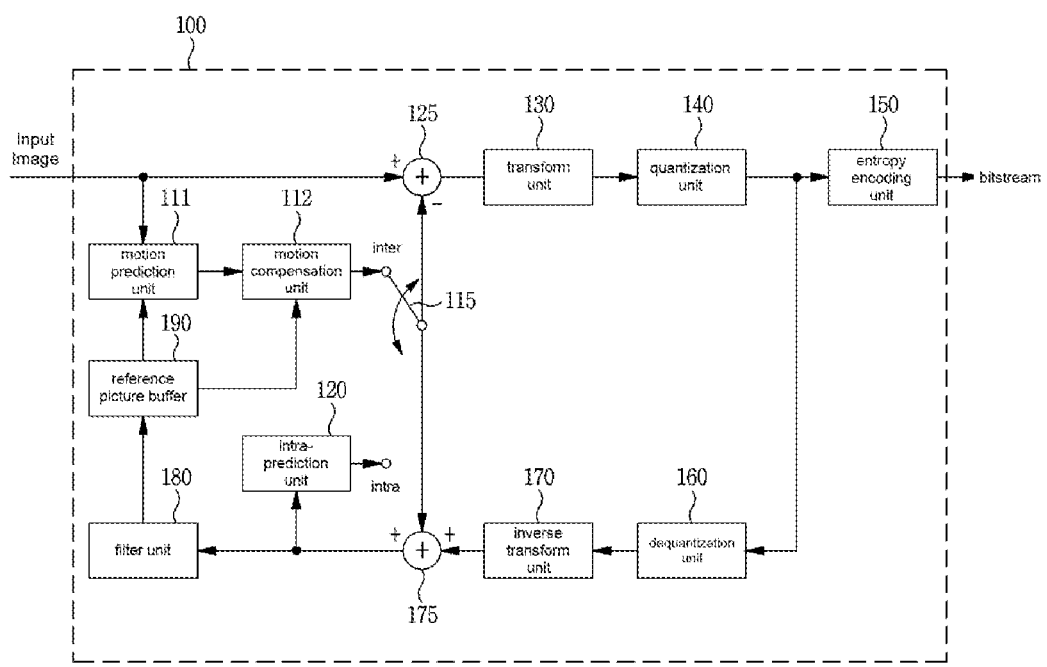
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term Description

Encoder: may mean an apparatus performing encoding.

Decoder: may mean an apparatus performing decoding.

Parsing: may mean determination of a value of a syntax element by performing entropy decoding, or may mean the entropy decoding itself.

Block: may mean a sample of an M×N matrix. Here, M and N are positive integers, and the block may mean a sample matrix in a two-dimensional form.

Sample: is a basic unit of a block, and may indicate a value ranging 0 to $2^{Bd-1}$ depending on the bit depth ($B_d$). The sample may mean a pixel in the present invention.

Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously encoded or decoded, and the reconstructed unit is spatially/temporally adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Prediction Unit: may mean a basic unit when performing inter prediction or intra prediction, and compensation for the prediction. One prediction unit may be partitioned into a plurality of partitions. In this case, each of the plurality of partitions may be a basic unit while performing the predictions and the compensation, and each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

Prediction Unit Partition: may mean the shape of a partitioned prediction unit.

Reference Picture List: may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

Inter-Prediction Indicator: may mean one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

Reference Picture Index: may mean an index of a specific reference picture in the reference picture list.

Reference Picture: may mean a picture to which a specific unit refers for inter prediction or motion compensation. A reference image may be referred to as the reference picture.

Motion Vector: is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

Motion Vector Candidate: may mean a unit that becomes a prediction candidate when predicting the motion vector, or may mean a motion vector of the unit.

Motion Vector Candidate List: may mean a list configured by using the motion vector candidate.

Motion Vector Candidate Index: may mean an indicator that indicates the motion vector candidate in the motion vector candidate list. The motion vector candidate index may be referred to as an index of a motion vector predictor.

Motion Information: may mean the motion vector, the reference picture index, and inter-prediction indicator as well as information including at least one of reference picture list information, the reference picture, the motion vector candidate, the motion vector candidate index, etc.

Merge Candidate List: may mean a list configured by using the merge candidate.

Merge Candidate: may include a spatial merge candidate, a temporal merge candidate, a combined merge candidate, a combined bi-prediction merge candidate, a zero merge candidate, etc. The merge candidate may include motion information such as prediction type information, a reference picture index for each list, a motion vector, etc.

Merge Index: may mean information indicating the merge candidate in the merge candidate list. In addition, the merge index may indicate a block, which derives the merge candidate, among reconstructed blocks spatially/temporally adjacent to the current block. In addition, the merge index may indicate at least one of pieces of motion information of the merge candidate Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is transmitted/received by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, on the basis of the coding unit, it is possible to determine which methods the motion prediction and compensation methods of a prediction unit in the coding unit uses among the skip mode, the merge mode, the AMVP mode, and a current picture reference mode. Inter prediction or motion compensation may be performed according to each mode. Here, the current picture reference mode may mean a prediction mode using a pre-reconstructed region of a current picture having an encoding target block. In order to specify the pre-reconstructed region, a motion vector for the current picture reference mode may be defined. Whether the encoding target block is encoded in the current picture reference mode may be encoded by using a reference picture index of the encoding target block.

The subtractor 125 may generate a residual block by using the a difference between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential Golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be transmitted for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
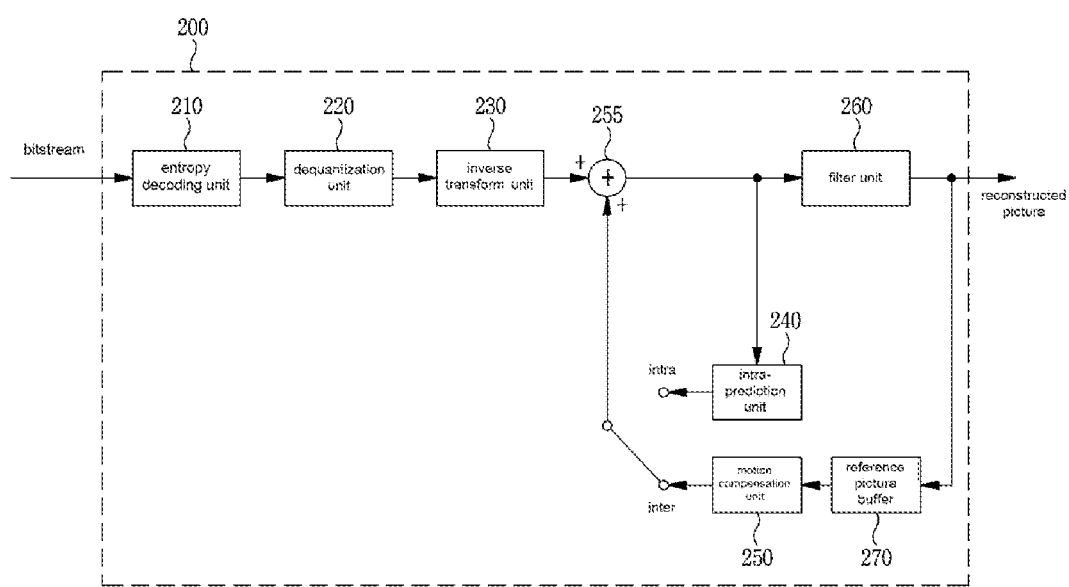
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning According to the size of the transform unit and the intra-prediction mode, instead of up-right scanning, it is possible to use vertical direction scanning and horizontal direction scanning That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, on the basis of the coding unit, it is possible to determine which method the motion compensation method of a prediction unit in the coding unit uses among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may not be adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of a reference picture index is 0 or the last position) within the reference picture list for the decoding target block. In addition, it is possible for the current picture to be variably positioned within the reference picture list, and to this end, it is possible to signal the reference picture index indicating a position of the current picture. Here, signaling a flag or an index may mean that the encoder entropy encodes the corresponding flag or index and includes into a bitstream, and that the decoder entropy decodes the corresponding flag or index from the bitstream.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
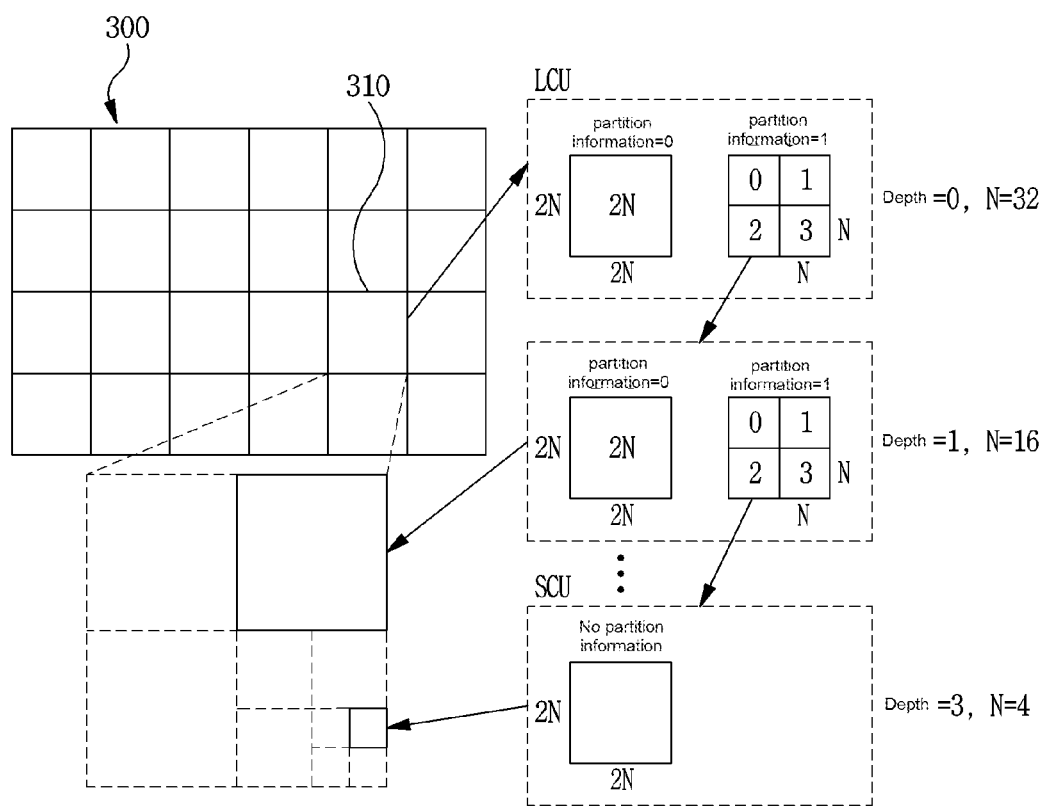
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding/decoding an image. The distribution may be determined on the basis of whether or not one CU will be partitioned in plural (a positive integer equal to or more than 2 including 2, 4, 8, 16, etc.). The width size and the height size of the CUs resulting from the partitioning may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored for each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the LCU having a minimum depth of 0 may be 64×64 pixels, and the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
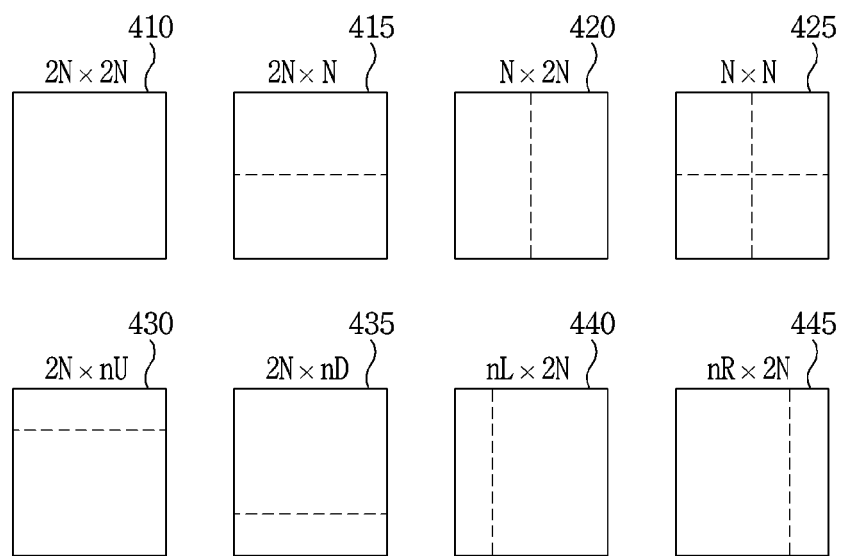
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
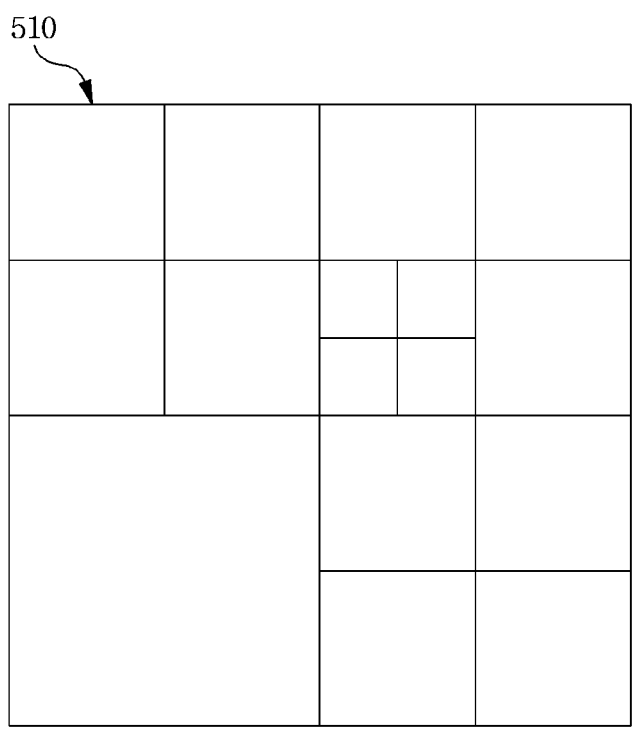
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for transform, quantization, inverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
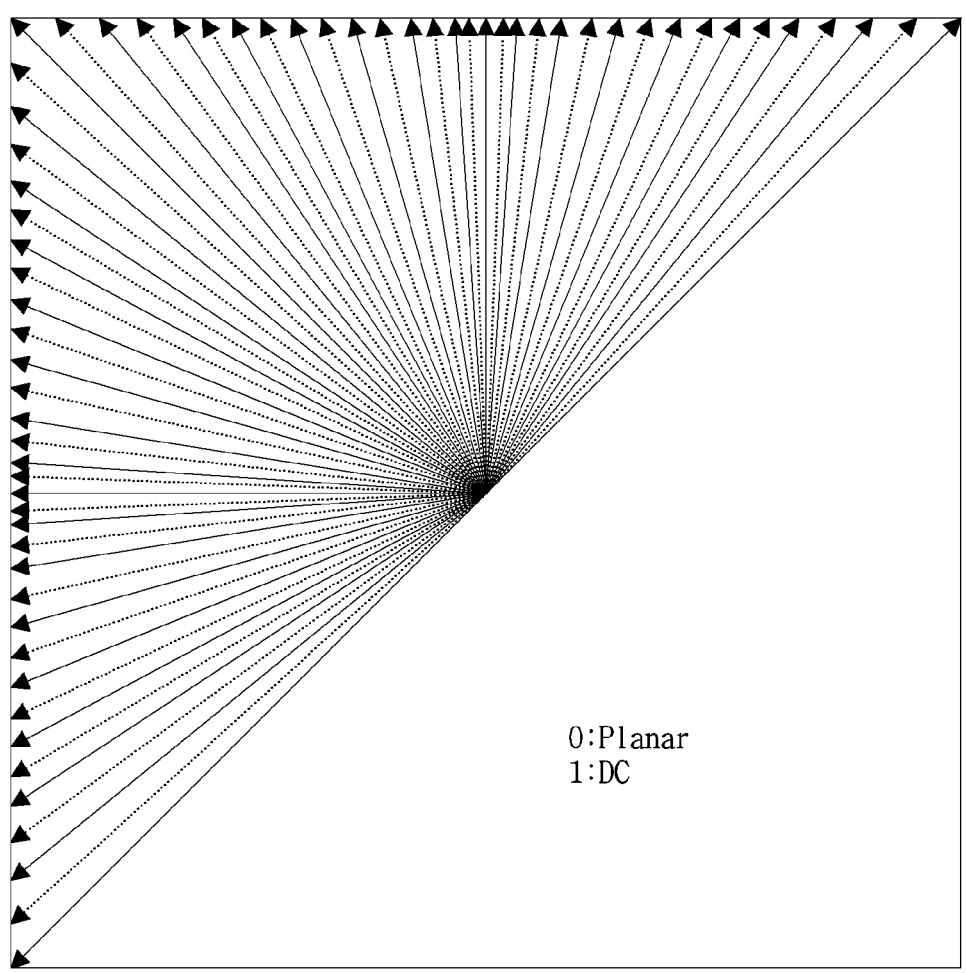
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be transmitted by using predetermined flag information. When the intra-prediction mode of the current prediction block is different from the intra-prediction mode of the neighboring prediction block, intra-prediction mode information of the encoding/decoding target block may be encoded by performing entropy encoding.

FIG. 7 is a view for explaining an embodiment of a process of inter prediction.

The quadrangular shapes shown in FIG. 7 may indicate images (or, pictures). Also, the arrows of FIG. 7 may indicate prediction directions. That is, images may be encoded or decoded or both according to prediction directions. Each image may be classified into an I-picture (intra picture), a P-picture (uni-predictive picture), a B-picture (bi-predictive picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in one of a forward direction and a reverse direction. Here, when an inter-prediction mode is used, the encoder may perform inter prediction or motion compensation, and the decoder may perform motion compensation in response to the encoder Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/ decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block horizontally adjacent to the encoding/decoding target block. Alternatively, the block positioned at the outer corner of the encoding/decoding target block may be a block that is horizontally adjacent to a neighboring block vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list.

A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be transmitted from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and transmitted from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference. The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may transmit the bitstream to the decoding apparatus 200. The bitstream may include the predefined information. The predefined information may include: 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/ decoding target block. The skip mode may be one of modes used for inter prediction. When the skip mode is used, the encoding apparatus 100 may entropy encode information about motion information of which block is used as motion information of the encoding target block, and may transmit the information to the decoding apparatus 200 through a bitstream. The encoding apparatus 100 may not transmit other information, for example, syntax element information, to the decoding apparatus 200. The syntax element information may include at least one of motion vector difference information, a coded block flag, and a transform coefficient level.

A residual signal generated after intra or inter prediction may be transformed into a frequency domain through a transform process as a part of a quantization process. Here, a primary transform may use DCT type 2 (DCT-II) as well as various DCT, DST kernels. On a residual signal, these transform kernels may perform a separable transform performing a 1D transform in a horizontal and/or vertical direction, or may perform a 2D non-separable transform.

For example, DCT and DST types used in transform may use DCT-II, DCT-V, DCT-VIII, DST-I, and DST-VII as shown in following tables in a case of the 1D transform. For example, as shown in the table 1 and table 2, a DCT or DST type used in transform by composing a transform set may be derived.

TABLE 1

| Transform set | Transform |
| --- | --- |
| 0 | DST_VII, DCT-VIII |
| 1 | DST-VII, DST-I |
| 2 | DST-VII, DCT-V |

TABLE 2

| Transform set | Transform |
| --- | --- |
| 0 | DST_VII, DCT-VIII, DST-I |
| 1 | DST-VII, DST-I, DCT-VIII |
| 2 | DST-VII, DCT-V, DST-I |

For example, as shown in FIG. 8, according to an intra-prediction mode, different transform sets are defined for horizontal and vertical directions. Next, the encoder/decoder may perform transform and/or inverse transform by using an intra-prediction mode of a current encoding/decoding target block and transform of a relevant transform set. In this case, entropy encoding/decoding is not performed on the transform set, and the encoder/decoder may define the transform set according to the same rule. In this case, information indicating which transform is used among transforms of the transform set may be entropy encoding/decoding. For example, when the size of a block is equal to or less than 64×64, three transform sets are composed as shown in table 2 according to an intra-prediction mode, and three transforms are used for each horizontal direction transform and vertical direction transform to combine and perform total nine multi-transform methods. Next, a residual signal is encoded/decoded by using the optimum transform method, whereby encoding efficiency can be enhanced. Here, in order to perform entropy encoding/decoding on information about which transform method is used among three transforms of one transform set, truncated unary binarization may be used. Here, for at least one of vertical transform and horizontal transform, entropy encoding/decoding may be performed on the information indicating which transform is used among transforms of a transform set.

Figure 9:
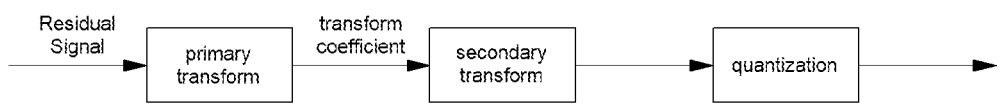
FIG. 9 is a view for explaining a process of transform.

After completing the above-described primary transform, the encoder may perform a secondary transform to increase energy concentration for transformed coefficients as shown in FIG. 9. The secondary transform may perform a separable transform performing a 1D transform in a horizontal and/or vertical direction, or may perform a 2D non-separable transform. Used transform information may be transmitted or may be derived by the encoder/decoder according to current and neighboring encoding information. For example, like the 1D transform, a transform set for the secondary transform may be defined. Entropy encoding/decoding is not performed on the transform set, and the encoder/decoder may define the transform set according to the same rule. In this case, information indicating which transform is used among transforms of the transform set may be transmitted, and the information may be applied to at least one residual signal through intra or inter prediction.

At least one of the number or types of transform candidates is different for each transform set. At least one of the number or types of transform candidates may be variably determined based on at least one of the location, the size, the partition form, and the prediction mode (intra/inter mode) or direction/non-direction of the intra-prediction mode of a block (CU, PU, TU, etc.).

The decoder may perform a secondary inverse transform depending on whether or not the secondary inverse transform is performed, and may perform a primary inverse transform depending on whether or not the primary inverse transform is performed from the result of the secondary inverse transform.

The above-described primary transform and secondary transform may be applied to at least one signal component of luma/chroma components or may be applied according to the size/shape of an arbitrary coding block. Entropy encoding/decoding may be performed on an index indicating both whether or not the primary transform/secondary transform is used and the used primary transform/secondary transform in an arbitrary coding block. Alternatively, the index may be tacitly derived by the encoder/decoder according to at least one piece of current/neighboring encoding information.

The residual signal generated after intra or inter prediction goes through a quantization process after the primary and/or secondary transform, and quantized transform coefficients go through an entropy encoding process. Here, the quantized transform coefficients may be scanned in diagonal, vertical, and horizontal directions based on at least one of the intra-prediction mode or the size/shape of a minimum block as shown in FIG. 10.

In addition, the quantized transform coefficients on which entropy decoding is performed may be arranged in block forms by being inverse scanned, and at least one of dequantization or inverse transform may be performed on the relevant block. Here, as a method of inverse scanning, at least one of diagonal direction scanning, horizontal direction scanning, and vertical direction scanning may be performed.

Figure 10:
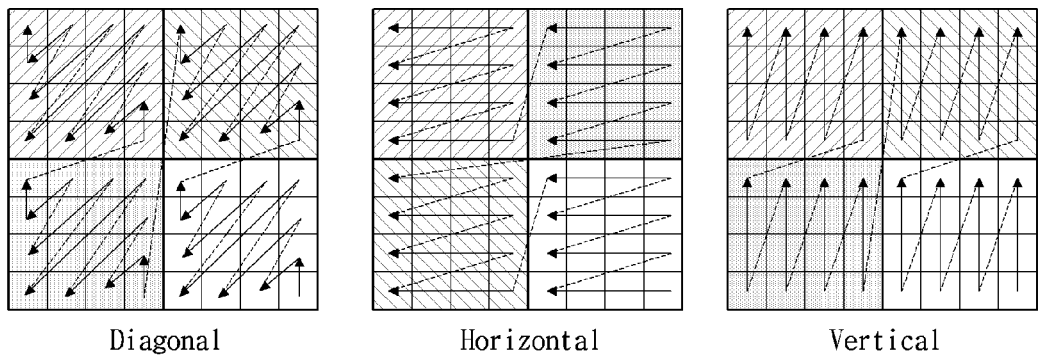
FIG. 10 is a view for explaining scanning of quantized transform coefficients.

For example, when the size of a current coding block is 8×8, primary transform, secondary transform, and quantization may be performed on a residual signal for the 8×8 block, and next, scanning and entropy encoding may be performed on quantized transform coefficients for each of four 4×4 sub-blocks according to at least one of three scanning order methods shown in FIG. 10. In addition, inverse scanning may be performed on the quantized transform coefficients by performing entropy decoding. The quantized transform coefficients on which inverse scanning is performed become transform coefficients after dequantization, and at least one of secondary inverse transform or primary inverse transform is performed, whereby a reconstructed residual signal can be generated.

Figure 11:
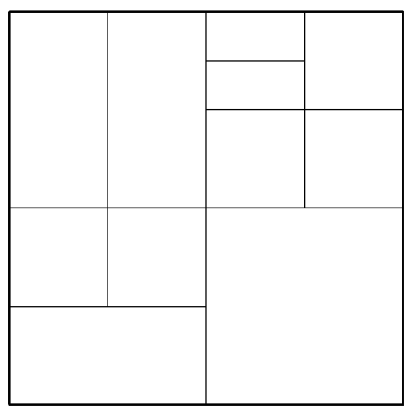
FIG. 11 is a view for explaining block partition.

In a video encoding process, one block may be partitioned as shown in FIG. 11, and an indicator corresponding to partition information may be signaled. Here, the partition information may be at least one of a partition flag (split_flag), a quad/binary tree flag (QB_flag), a quad tree partition flag (quadtree_flag), a binary tree partition flag (binarytree_flag), and a binary tree partition type flag (Btype_flag). Here, split_flag is a flag indicating whether or not a block is partitioned, QB_flag is a flag indicating whether a block is partitioned in a quad tree form or in a binary tree form, quadtree_flag is a flag indicating whether or not a block is partitioned in a quad tree form, binarytree_flag is a flag indicating whether or not a block is partitioned in a binary tree form, Btype_flag is a flag indicating whether a block is vertically or horizontally partitioned in a case of partition of a binary tree form.

When the partition flag is 1, it may indicate partitioning is performed, and when the partition flag is 0, it may indicate partitioning is not performed. In a case of the quad/binary tree flag, 0 may indicate a quad tree partition, and 1 may indicate a binary tree partition. Alternatively, 0 may indicate a binary tree partition, and 1 may indicate a quad tree partition. In a case of the binary tree partition type flag, 0 may indicate a horizontal direction partition, and 1 may indicate a vertical direction partition. Alternatively, 0 may indicate a vertical direction partition, and 1 may indicate a horizontal direction partition.

For example, partition information for FIG. 11 may be derived by signaling at least one of quadtree_flag, binarytree_flag, and Btype_flag as shown in table 3.

parameter, or a slice (segment). Alternatively, the size of a maximum/minimum block may be a fixed size that is preset in the encoder/decoder. For example, when the size of a block ranges 256×256 to 64×64, partitioning may be performed only in a quad tree form. In this case, the split_flag may be a flag indicating whether partitioning is performed in a quad tree form.

When the size of a block is in a predetermined range, partitioning may be performed only in a binary tree form. Here, the predetermined range may be defined as at least one of the size of a maximum block or the size of a minimum block that can be partitioned only in a binary tree form. Information indicating the size of a maximum/minimum block where a partition in the binary tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 16×16 to 8×8, partitioning may be performed only in a binary tree form. In this case, the split_flag may be a flag indicating whether partitioning is performed in a binary tree form.

After partitioning one block in a binary tree form, when the partitioned block is further partitioned, partitioning may be performed only in a binary tree form.

When the width or length size of the partitioned block cannot be further partitioned, at least one indicator may not be signaled.

Besides the quad tree based binary tree partitioning, the quad tree based partitioning may be performed after the binary tree partitioning.

Based on the above-described description, a method of encoding/decoding a view according to the present invention will be described in detail.

TABLE 3

| quadtree_flag | 1 | 0 | | | 1 | 0 | | | 0 | 0 | 0 | 0 | | | | | | 0 |
|---|---|---|---|---|---|---|---|---|---|---|---|---|---|---|---|---|---|---|
| binarytree_flag | | | 1 | 0 | 0 | | 1 | 0 | 0 | 0 | 0 | 0 | 1 | 1 | 0 | 0 | 0 | 0 |
| Btype_flag | | | | 1 | | | | 0 | | | | | 0 | 1 | | | | |

For example, partition information for FIG. 11 may be derived by signaling at least one of split_flag, QB_flag, and Btype_flag as shown in table 2.

TABLE 4

| split_flag | 1 | 1 | | | 0 | 0 | 1 | 1 | | 0 | 0 | 0 | 0 | 1 | | 1 | 0 | 0 | 0 | 0 |
|---|---|---|---|---|---|---|---|---|---|---|---|---|---|---|---|---|---|---|---|---|
| QB_flag | | 0 | 1 | | | | 0 | 1 | | | | | | | 1 | | | | | |
| Btype_flag | | | | 1 | | | | 0 | | | | | | | | 0 | 1 | | | |

The partition method may be performed only in a quad tree form or only in a binary tree form according to the size/shape of a block. In this case, the split_flag may mean a flag indicating whether partitioning is performed in a quad tree for or in a binary tree form. The size/shape of a block may be derived according to depth information of a block, and the depth information may be signaled.

Figure 12:
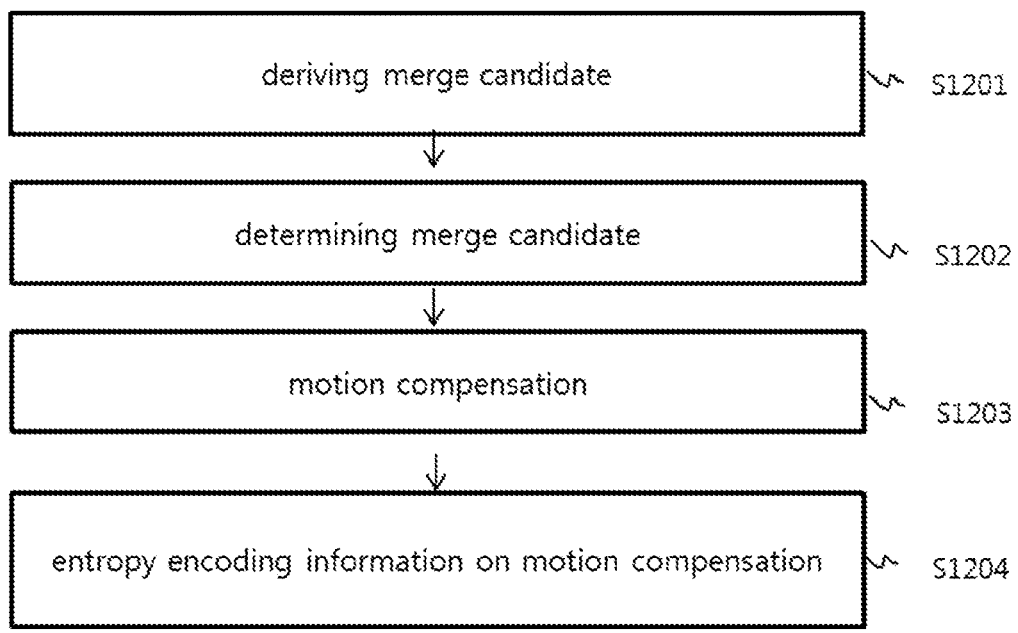
FIG. 12 is a flowchart showing a method for encoding a video by using a merge mode according to the present invention.
Figure 13:
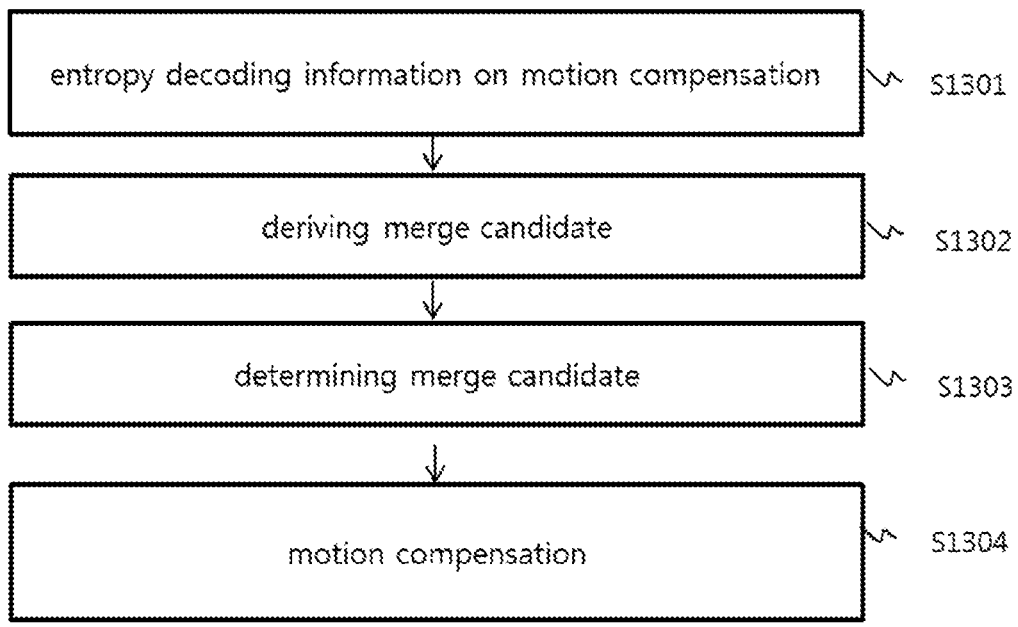
FIG. 13 is a flowchart showing a method for decoding a video by using a merge mode according to the present invention.

When the size of a block is in a predetermined range, partitioning may be performed only in a quad tree form. Here, the predetermined range may be defined as at least one of the size of a maximum block or the size of a minimum block that can be partitioned only in a quad tree form. Information indicating the size of a maximum/minimum block where a partition in the quad tree form is allowed may be signaled through a bitstream, and the information may be signaled by a unit of at least one of a sequence, a picture FIG. 12 is a flowchart showing a method for encoding a video by using a merge mode according to the present invention. FIG. 13 is a flowchart showing a method for decoding a video by using a merge mode according to the present invention.

Referring to FIG. 12, an encoding apparatus may derive a merge candidate at step S1201, and may generate a merge candidate list based on the derived merge candidate. When the merge candidate list is generated, motion information is determined by using the generated merge candidate list at step S1202, and motion compensation of the current block may be performed by using the determined motion information at step S1203. Next, the encoding apparatus may entropy encode information on motion compensation at step S1204.

Referring to FIG. 13, a decoding apparatus may entropy decode the information on motion compensation received from the encoding apparatus at step S1301, and may derive the merge candidate at step S1302, and may generate the merge candidate list based on the derived merge candidate. When the merge candidate list is generated, motion information of the current block may be determined by using the generated merge candidate list at step S1303. Next, the decoding apparatus may perform motion compensation by using the motion information at step S1304.

Hereinafter, steps shown in FIGS. 12 and 13 will be described in detail.

First, deriving of the merge candidate at steps S1201 and S1302 will be described in detail.

The merge candidate for the current block may include at least one of a spatial merge candidate, a temporal merge candidate, and an additional merge candidate.

The spatial merge candidate of the current block may be derived from a reconstructed block neighboring the current block. For example, motion information of the reconstructed block neighboring the current block may be determined as the spatial merge candidate for the current block. Here, the motion information may include at least one of a motion vector, a reference picture index, and a prediction list utilization flag.

In this case, the motion information of the spatial merge candidate may include motion information corresponding to L0 and L1 as well as motion information corresponding to L0, L1, . . . , LX. Here, X may be a positive integer including zero. Accordingly, a reference picture list may include at least one of L0, L1, . . . , LX.

FIG. 14 is a view showing an example of deriving a spatial merge candidate of a current block. Here, the deriving of the spatial merge candidate may mean deriving the spatial merge candidate and adding the spatial merge candidate to the merge candidate list.

Referring to FIG. 14, the spatial merge candidate of the current block may be derived from neighbor blocks adjacent to the current block X. The neighbor block adjacent to the current block may include at least one of a block (B1) adjacent to the top of the current block, a block (A1) adjacent to the left of the current block, a block (B0) adjacent to the top right corner of the current block, a block (B2) adjacent to the top left corner of the current block, and a block (A0) adjacent to the bottom left corner of the current block. In the meantime, the neighbor block adjacent to the current block may have a square shape or a non-square shape.

In order to derive the spatial merge candidate of the current block, whether or not the neighbor block adjacent to the current block can be used in deriving the spatial merge candidate of the current block may be determined. Here, whether or not the neighbor block adjacent to the current block can be used in deriving the spatial merge candidate of the current block may be determined according to predetermined priorities. For example, in the example shown in FIG. 14, availability of deriving the spatial merge candidate may be determined in the order of blocks at A1, B1, B0, A0, and B2 positions. The spatial merge candidates determined based on the order for determining availability may be added to the merge candidate list of the current block in sequence. The following are examples of the neighbor block that is unable to be used in deriving the spatial merge candidate of the current block.

1) a condition where spatial merge candidates are derived from blocks at A0, A1, B0, and B1 positions when the neighbor block is a block at B2 position 2) a condition where the neighbor block is absent (a condition where the current block exists at a picture boundary, a slice boundary or a tile boundary, etc.)

3) a condition where the neighbor block is intra coded 4) a condition where at least one of a motion vector, a reference picture index, and a reference picture of the neighbor block is the same as that of the previously derived spatial merge candidate 5) a condition where a motion vector of the neighbor block refers to a boundary outer area of at least one of a picture, a slice, and a tile in which the current block is included FIG. 15 is a view showing an example of adding a spatial merge candidate to a merge candidate list.

Referring to FIG. 15, when four spatial merge candidates are derived from the neighbor blocks at A1, B0, A0, and B2 positions, the derived spatial merge candidates may be added to the merge candidate list in sequence.

maxNumSpatialMergeCand may mean the maximum number of spatial merge candidates that can be included in the merge candidate list, and numMergeCand may mean the number of merge candidates included in the merge candidate list. maxNumSpatialMergeCand may be a positive integer including zero. maxNumSpatialMergeCand may be preset for the encoding apparatus and the decoding apparatus to use the same value. Alternatively, the encoding apparatus may encode the maximum number of merge candidates that can be included in the merge candidate list of the current block, and the maximum number may be signaled to the decoding apparatus through a bitstream.

As described above, when at least one spatial merge candidate is derived from the neighbor blocks A1, B1, B0, A0, and B2, spatial merge candidate flag information (spatialCand) indicating whether it is a spatial merge candidate may be set for each derived merge candidate. For example, when the spatial merge candidate is derived, spatialCand may be set to a predetermined value of one. Otherwise, spatialCand may be set to a predetermined value of zero. Also, whenever the spatial merge candidate is derived, spatial merge candidate count (spatialCandCnt) increases by one.

The spatial merge candidate may be derived based on at least one of coding parameters of the current block or the neighbor block.

The spatial merge candidate may be shared in blocks that are smaller than a block in size or are deeper than the block in depth, the block in which information on motion compensation is entropy encoded/decoded. Here, the information on motion compensation may be at least one of information on whether or not a skip mode is used, information on whether or not a merge mode is used or merge index information.

The block in which the information on motion compensation is entropy encoded/decoded may be a CTU or a sub-unit of a CTU, a CU, or a PU.

Hereinafter, for convenience of explanation, the size of the block in which the information on motion compensation is entropy encoded/decoded is referred to as a first block size. The depth of the block in which the information on motion compensation is entropy encoded/decoded is referred to as a first block depth.

Specifically, when the size of the current block is smaller than the first block size, the spatial merge candidate of the current block may be derived from at least one of reconstructed blocks adjacent to the higher block having the first block size. Also, the blocks included in the higher block may share the derived spatial merge candidate Here, the block having the first block size may be referred to as a higher block of the current block.

Figure 16:
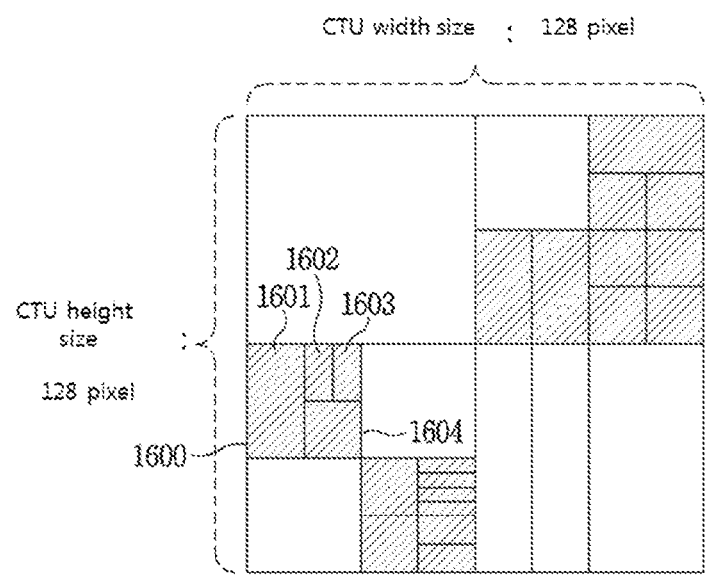
FIG. 16 is a view showing an embodiment of deriving and sharing a spatial merge candidate in a CTU.

FIG. 16 is a view showing an embodiment of deriving and sharing a spatial merge candidate in a CTU. Referring to FIG. 16, when the first block size is 32×32, the blocks 1601, 1602, 1603, and 1604 that are smaller than 32×32 may derive a spatial merge candidate from at least one of neighbor blocks adjacent to the higher block 1600 having the first block size, and may share the derived spatial merge candidate.

For example, when the first block size is 32×32 and the size of the coding block is 32×32, prediction blocks that are smaller than 32×32 may derive a spatial merge candidate of the prediction block from at least one piece of motion information of neighbor blocks of the coding block. The prediction blocks in the coding block may share the derived spatial merge candidate. Here, the coding block and the prediction block may mean blocks which are more generalized expressions.

When the depth of the current block is deeper than the first block depth, the spatial merge candidate may be derived from at least one of reconstructed blocks adjacent to the higher block having the first block depth. Also, the blocks included in the higher block may share the derived spatial merge candidate Here, the block having the first block depth may be referred to as a higher block of the current block.

For example, when the first block depth is two and the depth of the coding block is two, prediction blocks having the depth deeper than the block depth of two may derive a spatial merge candidate of the prediction block based on at least one piece of motion information of neighbor blocks of the coding block. The prediction blocks in the coding block may share the derived spatial merge candidate.

Here, the sharing of the spatial merge candidate may mean that respective merge candidate lists of sharing blocks can be generated based on the same spatial merge candidate.

Also, the sharing of the spatial merge candidate may mean that sharing blocks can perform motion compensation by using one merge candidate list. Here, a shared merge candidate list may include at least one of spatial merge candidates derived based on a higher block in which information on motion compensation is entropy encoded/decoded.

The neighbor block adjacent to the current block or the current block may have a square shape or a non-square shape.

Also, the neighbor block adjacent to the current block may be partitioned into sub-blocks. In this case, among sub-blocks of the neighbor block adjacent to the current block, motion information of one sub-block may be determined as a spatial merge candidate of the current block. Also, a spatial merge candidate of a current block may be determined based on at least one piece of motion information of sub-blocks of a neighbor block adjacent to the current block. Here, whether or not the sub-block of the neighbor block can be used in deriving the spatial merge candidate may be decided to determine the spatial merge candidate of the current block. Availability of being used in deriving the spatial merge candidate may include at least one of whether or not motion information of the sub-block of the neighbor block exists, and whether or not the motion information of the sub-block of the neighbor block can be used as the spatial merge candidate of the current block.

Also, one of a median value, an average value, a minimum value, a maximum value, a weighted average value or a mode of at least one piece (i.e., a motion vector) of motion information of the sub-blocks of the neighbor block may be determined as the spatial merge candidate of the current block.

Next, a method of deriving a temporal merge candidate of the current block will be described.

The temporal merge candidate of the current block may be derived from a reconstructed block included in a collocated picture of a current picture. Here, the collocated picture is a picture that has been encoded/decoded before the current picture. The collocated picture may be a picture having different temporal order from the current picture.

Figure 17:
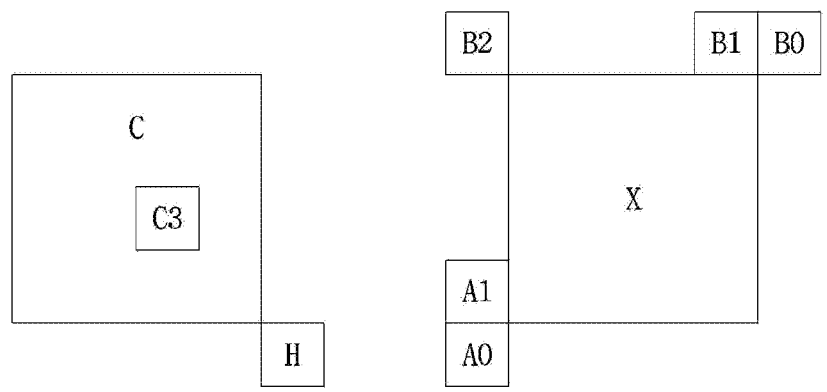
FIG. 17 is a view showing an example of deriving a temporal merge candidate of a current block.

FIG. 17 is a view showing an example of deriving a temporal merge candidate of a current block. Here, the deriving of the temporal merge candidate may mean deriving the temporal merge candidate and adding the temporal merge candidate to the merge candidate list.

Referring to FIG. 17, in the collocated picture of the current picture, the temporal merge candidate of the current block may be derived from a block including an outer position of a block corresponding to spatially the same position as the current block X or from a block including an inner position of a block corresponding to spatially the same position as the current block X. Here, the temporal merge candidate may mean motion information of the collocated block. For example, the temporal merge candidate of the current block X may be derived from a block H adjacent to the bottom right corner of a block C corresponding to spatially the same position as the current block, or from a block C3 including the center point of the block C. The block H or the block C3 that is used to derive the temporal merge candidate of the current block may be referred to as 'a collocated block'.

In the meantime, the collocated block of the current block or the current block may have a square shape or a non-square shape.

When the temporal merge candidate of the current block can be derived from the block H including the outer position of the block C, the block H may be set to the collocated block of the current block. In this case, the temporal merge candidate of the current block may be derived based on motion information of the block H. In contrast, when the temporal merge candidate of the current block cannot be derived from the block H, the block C3 including the inner position of the block C may be set to the collocated block of the current block. In this case, the temporal merge candidate of the current block may be derived based on motion information of the block C3. When the temporal merge of the current block cannot be derived from the block H and the block C3 (for example, when both the block H and the block C3 are intra coded), the temporal merge candidate of the current block may not be derived or may be derived from a block at a different position from the block H and the block C3.

As another example, the temporal merge candidate of the current block may be derived from a plurality of blocks in the collocated picture. For example, a plurality of temporal merge candidates of the current block may be derived from the block H and the block C3.

FIG. 18 is a view showing an example of adding a temporal merge candidate to a merge candidate list.

Referring to FIG. 18, when one temporal merge candidate is derived from a collocated block at H1 position, the derived temporal merge candidate may be added to the merge candidate list.

The collocated block of the current block may be partitioned into sub-blocks. In this case, among the sub-blocks of the collocated block of the current block, motion information of one sub-block may be determined as the temporal merge candidate of the current block. Also, the temporal merge candidate of the current block may be determined based on at least one piece of motion information of the sub-blocks of the collocated block of the current block.

Here, whether or not motion information of the sub-block of the collocated block exists or whether or not motion information of the sub-block of the collocated block can be used as the temporal merge candidate of the current block is decided to determine the temporal merge candidate of the current block.

Also, one of a median value, an average value, a minimum value, a maximum value, a weighted average value or a mode of at least one piece (i.e., a motion vector) of motion information of sub-blocks of the collocated block may be determined as the temporal merge candidate of the current block.

In FIG. 17, the temporal merge candidate of the current block can be derived from the block adjacent to the bottom right corner of the collocated block or from the block including the center point of the collocated block. However, the positions of the blocks for deriving the temporal merge candidate of the current block are not limited to the example shown in FIG. 17. For example, the temporal merge candidate of the current block may be derived from a block adjacent to the top/bottom boundary, the left/right boundary or a corner of the collocated block, and may be derived from a block including a particular position in the collocated block (i.e., a block adjacent to the corner boundary of the collocated block).

The temporal merge candidate of the current block may be determined by considering the reference picture lists (or prediction direction) of the current block and the collocated block. In the meantime, motion information of the temporal merge candidate may include motion information corresponding to L0 and L1 as well as motion information corresponding to L0, L1, . . . , LX. Here, X may be a positive integer including zero.

For example, when the reference picture list that can be used by the current block is L0 (namely, when the inter-prediction indicator indicates PRED_L0), motion information corresponding to L0 in the collocated block may be derived as the temporal merge candidate of the current block. That is, when the reference picture list that can be used by the current block is LX (here, X is an integer such as 0, 1, 2 or 3 indicating an index of the reference picture list), motion information (hereinafter, referred to as 'LX motion information') corresponding to LX of the collocated block may be derived as the temporal merge candidate of the current block.

When the current block uses a plurality of reference picture lists, the temporal merge candidate of the current block may be determined by considering the reference picture lists of the current block and the collocated block.

For example, when bi-directional prediction is performed on the current block (namely, the inter-prediction indicator is PRED_BI), at least two pieces of information selected from the group consisting of L0 motion information, L1 motion information, L2 motion information, . . . , and LX motion information of the collocated block may be derived as temporal merge candidates. When tri-directional prediction is performed on the current block (namely, the inter-prediction indicator is PRED_TRI), at least three pieces of information selected from the group consisting of L0 motion information, L1 motion information, L2 motion information, . . . , and LX motion information of the collocated block may be derived as temporal merge candidates. When quad-directional prediction is performed on the current block (namely, inter-prediction indicator is PRED_QUAD), at least four pieces of information selected from the group consisting of L0 motion information, L1 motion information, L2 motion information, . . . , and LX motion information of the collocated block may be derived as temporal merge candidates.

Also, at least one of the temporal merge candidate, the collocated picture, the collocated block, the prediction list utilization flag, and the reference picture index may be derived based on at least one of coding parameters of the current block, the neighbor block, and the collocated block.

When the number of derived spatial merge candidates is less than the maximum number of merge candidates, the temporal merge candidate may be preliminarily derived. Accordingly, when the number of derived spatial merge candidates reaches the maximum number of merge candidates, a process of deriving the temporal merge candidate may be omitted.

For example, when the maximum number of merge candidates is two and the two derived spatial merge candidates have different values, a process of deriving the temporal merge candidate may be omitted.

As another example, the temporal merge candidate of the current block may be derived based on the maximum number of temporal merge candidates. Here, the maximum number of temporal merge candidates may be preset for the encoding apparatus and the decoding apparatus to use the same value. Alternatively, information indicating the maximum number of temporal merge candidates of the current block may be encoded through a bitstream, and may be signaled to the decoding apparatus. For example, the encoding apparatus may encode maxNumTemporalMergeCand indicating the maximum number of temporal merge candidates of the current block, and maxNumTemporalMergeCand may be signaled to the decoding apparatus through a bitstream. Here, maxNumTemporalMergeCand may be set to a positive integer including zero. For example, maxNumTemporalMergeCand may be set to one. The value of maxNumTemporalMergeCand may be variously derived based on information on the number of temporal merge candidates being signaled, and may be a fixed value preset in the encoder/decoder.

When the distance between the current picture in which the current block is included and the reference picture of the current block is different from the distance between the collocated picture in which the collocated block is included and the reference picture of the collocated block, a motion vector of the temporal merge candidate of the current block may be obtained by scaling a motion vector of the collocated block. Here, scaling may be performed based on at least one of the distance between reference pictures referenced by the current picture and the current block, and the distance between reference pictures referenced by the collocated picture and the collocated block. For example, according to the ratio of the distance between reference pictures referenced by the current picture and the current block and of the distance between reference pictures referenced by the collocated picture and the collocated block, the motion vector of the collocated block is scaled, thereby deriving the motion vector of the temporal merge candidate of the current block.

Based on the size (the first block size) or the depth (the first block depth) of a block in which information on motion compensation is entropy encoded/decoded, the temporal merge candidate may be shared in blocks that are smaller than a block in size or are deeper than the block in depth, the block being the one in which information on motion compensation is entropy encoded/decoded. Here, the information on motion compensation may be at least one of information on whether or not a skip mode is used, information on whether or not a merge mode is used, and merge index information.

The block in which information on motion compensation is entropy encoded/decoded may be a CTU or a sub-unit of a CTU, a CU, or a PU.

Specifically, when the size of the current block is less than the first block size, the temporal merge candidate of the current block may be derived from a collocated block of a higher block having the first block size. Also, the blocks included in the higher block may share the derived temporal merge candidate.

Also, when the depth of the current block is deeper than the first block depth, the temporal merge candidate may be derived from a collocated block of a higher block having the first block depth. Also, the blocks included in the higher block may share the derived temporal merge candidate.

Here, the sharing of the temporal merge candidate may mean that respective merge candidate lists of sharing blocks can be generated based on the same temporal merge candidate.

Also, the sharing of the temporal merge candidate may mean that sharing blocks can perform motion compensation by using one merge candidate list. Here, shared merge candidate list may include the temporal merge candidate derived based on a higher block in which information on motion compensation is entropy encoded/decoded.

FIG. 19 is a view showing an example of scaling a motion vector of motion information of a collocated block to derive a temporal merge candidate of a current block.

The motion vector of the collocated block may be scaled based on at least one of a difference value (td) between POC (Picture order count) indicating the display order of the collocated picture and POC of the reference picture of the collocated block, and a difference value (tb) between POC of the current picture and POC of the reference picture of the current block.

Before performing scaling, td or tb may be adjusted so that td or tb exists within a predetermined range. For example, when the predetermined range indicates −128~127 and td or tb is less than −128, td or tb may be adjusted to −128. When td or tb is greater than 127, td or tb may be adjusted to 127. When td or tb is in the range of −128~127, td or tb is not adjusted.

A scaling factor DistScaleFactor may be calculated based on td or tb. Here, the scaling factor may be calculated based on the following formula 1.

DistScaleFactor=(tb*tx+32)>>6 tx=(16384+Abs(td/2))/td   [Formula 1]

In formula 1, an absolute value function is designated as Abs( ), and the output value of the function is the absolute value of the input value.

The value of the scaling factor DistScaleFactor calculated based on formula 1 may be adjusted to a predetermined range. For example, DistScaleFactor may be adjusted to exist in a range of −1024~1023.

By scaling the motion vector of the collocated block by using the scaling factor, the motion vector of the temporal merge candidate of the current block may be determined. For example, the motion vector of the temporal merge candidate of the current block may be determined by the following formula 2.

Sign(DistScaleFactor*mvCol)*((Abs
(DistScaleFactor*mvCol)+127)>>8)   [Formula 2]

In formula 2, Sign( ) is a function outputting sign information of the value in ( ). For example, Sign(−1) outputs −. In formula 2, the motion vector of the collocated block may be designated as mvCol.

Next, a method of deriving an additional merge candidate of the current block will be described.

The additional merge candidate may mean at least one of a modified spatial merge candidate, a modified temporal merge candidate, a combined merge candidate, and a merge candidate having a predetermined motion information value. Here, the deriving of the additional merge candidate may mean deriving the additional merge candidate and adding the additional merge candidate to the merge candidate list.

The modified spatial merge candidate may mean a merge candidate in which at least one piece of motion information of the derived spatial merge candidate is modified.

The modified temporal merge candidate may mean a merge candidate in which at least one piece of motion information of the derived temporal merge candidate is modified.

The combined merge candidate may mean a merge candidate derived by combining at least one piece of motion information among motion information of the spatial merge candidate, the temporal merge candidate, the modified spatial merge candidate, the modified temporal merge candidate, the combined merge candidate, and the merge candidates having the predetermined motion information value that exist in the merge candidate list.

Alternatively, the combined merge candidate may mean a merge candidate derived by combining at least one piece of motion information of a spatial merge candidate, a temporal merge candidate, a modified spatial merge candidate, a modified temporal merge candidate, a combined merge candidate, and a merge candidate having a predetermined motion information value. The spatial merge candidate and the temporal merge candidate are derived from a block that does not exist in the merge candidate list but can be used to derive at least one of the spatial merge candidate and the temporal merge candidate. The modified spatial merge candidate and the modified temporal merge candidate are generated based on the spatial merge candidate and the temporal merge candidate.

Alternatively, the combined merge candidate may be derived by using motion information that is entropy decoded from a bitstream by the decoder. Here, the motion information used in deriving the combined merge candidate may be entropy encoded in a bitstream by the encoder.

The combined merge candidate may mean a combined bi-predictive merge candidate. The combined bi-predictive merge candidate is a merge candidate using bi-prediction, and may mean a merge candidate having L0 motion information and L1 motion information.

Also, the combined merge candidate may mean a merge candidate having at least N selected from the group consisting of L0 motion information, L1 motion information, L2 motion information, and L3 motion information. Here, N may mean a positive integer equal to or greater than two.

The merge candidate having the predetermined motion information value may mean a zero merge candidate of which the motion vector is (0, 0). In the meantime, the merge candidate having the predetermined motion information value may be preset for the encoding apparatus and the decoding apparatus to use the same value.

At least one of the modified spatial merge candidate, the modified temporal merge candidate, the combined merge candidate, and the merge candidate having the predetermined motion information value may be derived or generated based on at least one of coding parameters of the current block, the neighbor block, and the collocated block. Also, at least one of the modified spatial merge candidate, the modified temporal merge candidate, the combined merge candidate, and the merge candidate having the predetermined motion information value may be added to the merge candidate list based on at least one of the coding parameters of the current block, the neighbor block, and the collocated block.

The additional merge candidate may be derived for each sub-block of the current block, the neighbor block, or the collocated block. The merge candidate derived for each sub-block may be added to the merge candidate list of the current block.

The additional merge candidate may be derived in only a case of B slice/B picture or a case of a slice/picture using at least M reference picture lists. Here, M may be three or four, and may mean a positive integer equal to or greater than three.

Up to N additional merge candidates may be derived. Here, N is a positive integer including zero. N may be a variable value derived based on information on the maximum number of merge candidates included in the merge candidate list. Alternatively, N may be a fixed value preset in the encoder/decoder. Here, N may differ depending on the size, shape, depth or position of a block encoded/decoded in a merge mode.

The size of the merge candidate list is a preset size, and may be increased by the number of additional merge candidates generated after adding the spatial merge candidate or the temporal merge candidate. In this case, all the generated additional merge candidates may be included in the merge candidate list. In contrast, the size of the merge candidate list may be increased to a size smaller than the number of the additional merge candidates (for example, the number of the additional merge candidates—N, N is a positive integer). In this case, only a part of the generated additional merge candidates may be included in the merge candidate list.

Also, the size of the merge candidate list may be determined based on the coding parameters of the current block, the neighbor block, or the collocated block, and may be changed based on the coding parameters.

In order to increase throughput of the merge mode in the encoder and the decoder, motion compensation using the merge mode may be performed through only spatial merge candidate derivation, temporal merge candidate derivation, and zero merge candidate derivation without deriving the combined merge candidate. In a case of performing a combined merge candidate derivation process after a temporal merge candidate derivation process which requires relatively considerable cycle time, when the combined merge candidate derivation process is not performed, the worst case of the hardware complexity of the merge mode may be the temporal merge candidate derivation process rather than the combined merge candidate derivation process after the temporal merge candidate derivation process. Accordingly, the cycle time required in deriving each merge candidate in the merge mode may be reduced. Also, in the merge mode where the combined merge candidate is not derived, there is no dependency between merge candidate derivation processes. Thus, it is advantageous in that spatial merge candidate derivation, temporal merge candidate derivation, and zero merge mode candidate derivation may be performed in parallel.

Figures 20, 21A:
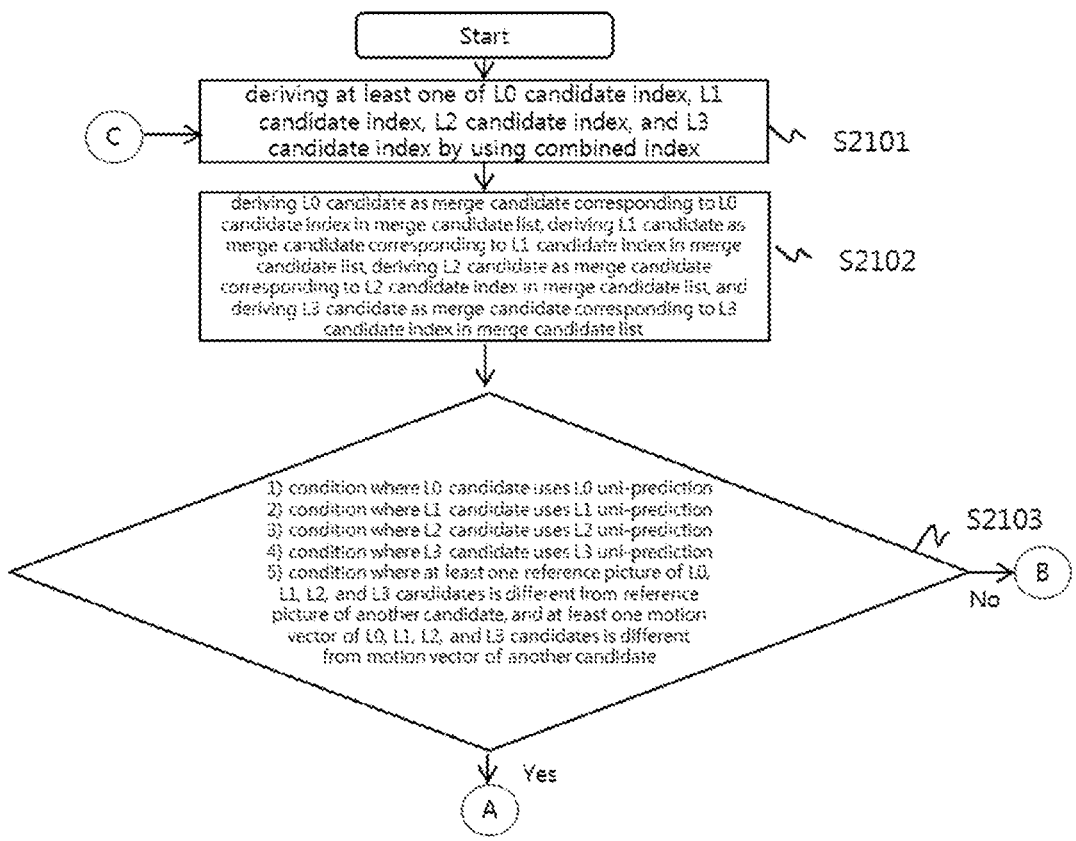
FIG. 20 is a view showing combined indexes.
FIG. 21a and FIG. 21b are views showing an embodiment of a method of deriving a combined merge candidate.
Figure 21B:
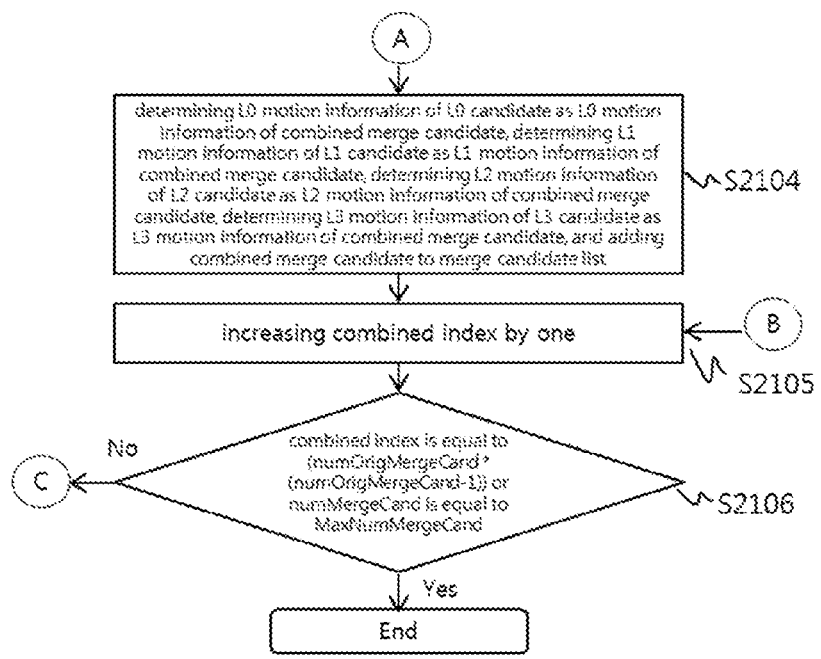

FIG. 21A and FIG. 21B are views showing an embodiment of a method of deriving a combined merge candidate. When at least one merge candidate exists in the merge candidate list or when the number of the merge candidates (numOrigMergeCand) in the merge candidate list is less than the maximum number of merge candidates (MaxNumMergeCand) before deriving the combined merge candidate, the method of deriving the combined merge candidate in FIG. 21a and FIG. 21b may be performed.

Referring to FIG. 21A and FIG. 21B, the encoder/decoder may set the input number of merge candidates (numInputMergeCand) as the number of merge candidates (numMergeCand) in the current merge candidate list, and may set the combined index (combIdx) to zero. The k-th (numMergeCand−numInputMergeCand) combined merge candidate may be derived.

The encoder/decoder may derive at least one of L0 candidate index (l0CandIdx), L1 candidate index (l1CandIdx), L2 candidate index (l2CandIdx), and L3 candidate index (l3CandIdx) by using the combined indexes as shown in FIG. 20 at step S2101.

Each candidate index may indicate the merge candidate in the merge candidate list. Motion information of the candidate index according to L0, L1, L2, and L3 may be motion information on L0, L1, L2, and L3 of the combined merge candidate.

The encoder/decoder may derive L0 candidate (l0Cand) as a merge candidate (mergeCandList[l0CandIdx]) corresponding to L0 candidate index in the merge candidate list, may derive L1 candidate (l1Cand) as a merge candidate (mergeCandList[l1CandIdx]) corresponding to L1 candidate index in the merge candidate list, and may derive L2 candidate (l2Cand) as a merge candidate(mergeCandList [l2CandIdx]) corresponding to L2 candidate index in the merge candidate list, and may derive L3 candidate (l3Cand) as a merge candidate(mergeCandList[l3CandIdx]) corresponding to L3 candidate index in the merge candidate list at step S2102.

The encoder/decoder may perform step S2104 when at least one of the following conditions is satisfied at step S2103 and, otherwise, may perform step S2105.

1) a condition where L0 candidate uses L0 uni-prediction (predFlagL0l0Cand==1)

2) a condition where L1 candidate uses L1 uni-prediction (predFlagL1l1Cand==1)

3) a condition where L2 candidate uses L2 uni-prediction (predFlagL2l2Cand==1)

4) a condition where L3 candidate uses L3 uni-prediction (predFlagL3l3Cand==1)

5) a condition where at least one reference picture of L0, L1, L2, and L3 candidates is different from a reference picture of another candidate, and at least one motion vector of L0, L1, L2, and L3 candidates is different from a motion vector of another candidate When at least one of the above-mentioned five conditions is satisfied at step S2103—Yes, the encoder/decoder may determine L0 motion information of L0 candidate as L0 motion information of a combined candidate, may determine L1 motion information of L1 candidate as L1 motion information of a combined candidate, may determine L2 motion information of L2 candidate as L2 motion information of a combined candidate, may determine L3 motion information of L3 candidate as L3 motion information of a combined candidate, and may add a combined merge candidate (combCandk) to the merge candidate list at step S2104.

For example, information on the combined merge candidate may be the same as follows.

L0 reference picture index of K-th combined merge candidate (refIdxL0combCandk)=L0 reference picture index of L0 candidate (refIdxL0l0Cand)

L1 reference picture index of K-th combined merge candidate (refIdxL1combCandk)=L1 reference picture index of L1 candidate (refIdxL1l1Cand)

L2 reference picture index of K-th combined merge candidate (refIdxL2combCandk)=L2 reference picture index of L2 candidate (refIdxL2l2Cand)

L3 reference picture index of K-th combined merge candidate (refIdxL3combCandk)=L3 reference picture index of L3 candidate (refIdxL3l3Cand)

L0 prediction list utilization flag of K-th combined merge candidate (predFlagL0combCandk)=1

L1 prediction list utilization flag of K-th combined merge candidate (predFlagL1combCandk)=1

L2 prediction list utilization flag of K-th combined merge candidate (predFlagL2combCandk)=1

L3 prediction list utilization flag of K-th combined merge candidate (predFlagL3combCandk)=1 x component of L0 motion vector of K-th combined merge candidate (mvL0combCand[0])=x component of L0 motion vector of L0 candidate (mvL0l0Cand[0])

y component of L0 motion vector of K-th combined merge candidate (mvL0combCandk[1])=y component of L0 motion vector of L0 candidate (mvL0l0Cand[1])

x component of L1 motion vector of K-th combined merge candidate (mvL1combCandk[0])=x component of L1 motion vector of L1 candidate (mvL1l1Cand[0])

y component of L1 motion vector of K-th combined merge candidate (mvL1combCandk[1])=y component of L1 motion vector of L1 candidate (mvL1l1Cand[1])

x component of L2 motion vector of K-th combined merge candidate (mvL2combCandk[0])=x component of L2 motion vector of L2 candidate (mvL2l2Cand[0])

y component of L2 motion vector of K-th combined merge candidate (mvL2combCandk[1])=y component of L2 motion vector of L2 candidate (mvL2l2Cand[1])

x component of L3 motion vector of K-th combined merge candidate (mvL3combCandk[0])=x component of L3 motion vector of L3 candidate (mvL3l3Cand[0])

y component of L3 motion vector of K-th combined merge candidate (mvL3combCandk[1])=y component of L3 motion vector of L3 candidate (mvL3l3Cand[1])

numMergeCand=numMergeCand+1

Also, the encoder/decoder may increase the combined index by one at step S2105.

Also, when the combined index is equal to (numOrigMergeCand * (numOrigMergeCand−1)) or when the number of merge candidates (numMergeCand) in the current merge candidate list is equal to the maximum number of merge candidates (MaxNumMergeCand) at step S2106, the encoder/decoder may terminate the combined merge candidate derivation step, and other wise, may perform step S2101.

When performing the method of deriving the combined merge candidate in FIG. 21A and FIG. 21B, the derived combined merge candidate may be added to the merge candidate list as shown in FIG. 22.

In the meantime, when at least two spatial merge candidates exist in the merge candidate list or when the number of merge candidates (numOrigMergeCand) in the merge candidate list is less than the maximum number of merge candidates (MaxNumMergeCand) before deriving the combined merge candidate, the method of deriving the combined merge candidate by using only the spatial merge candidates may be performed. In this case, the method of deriving the combined merge candidate in FIG. 21A and FIG. 21B may be used.

However, L0 candidate index, L1 candidate index, L2 candidate index, and L3 candidate index that are derived at step S2101 on FIG. 21A may indicate only merge candidates of which spatial merge candidate flag information (spatialCand) is one. Accordingly, L0 candidate, L1 candidate, L2 candidate, and L3 candidate that are derived at step S2102 may be derived by using merge candidates of which spatial merge candidate flag information (spatialCand) is one in the merge candidate list, namely, only by using spatial merge candidates.

Also, at step S2106 of FIG. 21B, instead of the value of (numOrigMergeCand*(numOrigMergeCand-1)), the value of (spatialCandCnt*(spatialCandCnt-1)) is compared with the combined index. When the combined index is equal to (spatialCandCnt*(spatialCandCnt-1)) or when the number of merge candidates (numMergeCand) in the current merge candidate list is equal to 'MaxNumMergeCand', the combined merge candidate derivation step may be terminated and, otherwise, step S2101 may be performed.

When performing the method of deriving the combined merge candidate by using only spatial merge candidates, the combined merge candidate combined only with spatial merge candidates may be added to the merge candidate list as shown in FIG. 23.

FIGS. 22 and 23 are views showing an example of deriving a combined merge candidate by using at least one of a spatial merge candidate, a temporal merge candidate, and a zero merge candidate, and of adding the combined merge candidate to a merge candidate list.

Here, a merge candidate having at least one piece of L0 motion information, L1 motion information, L2 motion information, and L3 motion information may be included in the merge candidate list. In the meantime, L0, L1, L2, L3 reference picture lists have been described as examples, without being limited thereto. A merge candidate having motion information on L0~LX reference picture lists (X is a positive integer) may be included in the merge candidate list.

Each piece of motion information may include at least one of a motion vector, a reference picture index, and a prediction list utilization flag.

As shown in FIGS. 22 and 23, at least one of merge candidates may be determined as the final merge candidate. The determined final merge candidate may be used as motion information of the current block. The motion information may be used in inter prediction or motion compensation of the current block. Also, by changing at least one value of information corresponding to motion information of the current block, the motion information may be used in inter prediction or motion compensation of the current block. Here, the value to be changed among information corresponding to motion information may be at least one of x component of the motion vector, y component of the motion vector, and the reference picture index. Also, when changing at least one value of information corresponding to motion information, at least one value of information corresponding to motion information may be changed so as to indicate the minimum distortion by using a distortion calculation method (SAD, SSE, MSE, etc.).

The prediction block for the current block may be generated by using at least one piece of L0 motion information, L1 motion information, L2 motion information, and L3 motion information according to motion information of the merge candidate. The generated prediction block may be used in inter prediction or motion compensation of the current block.

When at least one piece of L0 motion information, L1 motion information, L2 motion information, and L3 motion information is used in generating the prediction block, the inter-prediction indicator may be indicated as PRED_LX which is uni-directional prediction indicating PRED_L0 or PRED_L1, and as PRED_BI_LX which is bi-directional prediction for a reference picture list X. Here, X may mean a positive integer including 0 such as 0, 1, 2, 3, etc.

Also, the inter-prediction indicator may be indicated as PRED_TRI which is tri-directional prediction when at least three pieces of information selected from the group consisting of L0 motion information, L1 motion information, L2 motion information, and L3 motion information are used. Also, the inter-prediction indicator may be indicated as PRED_QUAD which is quad-directional prediction when at least four pieces of information selected from the group consisting of L0 motion information, L1 motion information, L2 motion information, and L3 motion information are used.

For example, when the inter-prediction indicator for the reference picture list L0 is PRED_L0 and the inter-prediction indicator for the reference picture list L1 is PRED_BI_L1, the inter-prediction indicator of the current block may be PRED_TRI. That is, the sum of the number of prediction blocks indicated by the inter-prediction indicator for each reference picture list may be the inter-prediction indicator of the current block.

Also, there may be at least one reference picture list such as L0, L1, L2, L3, etc. The merge candidate list as shown in FIGS. 22 and 23 may be generated for each reference picture list. Accordingly, when generating the prediction block for the current block, at least one to at most N prediction blocks may be generated to be used in inter prediction or motion compensation for the current block. Here, N may mean a positive integer equal to or greater than 1 such as 1, 2, 3, 4, etc.

In order to reduce memory bandwidth and to enhance processing speed, when at least one of the reference picture index and the motion vector of the merge candidate is the same as that of another merge candidate or is in a predetermined range, it may be used in deriving the combined merge candidate.

For example, among the merge candidates included in the merge candidate list, the merge candidates of which the reference picture indexes are the same at a predetermined value may be used in deriving the combined merge candidate Here, the predetermined value may be a positive integer including zero.

As another example, among the merge candidates included in the merge candidate list, the merge candidates of which the reference picture indexes are in a predetermined range may be used in deriving the combined merge candidate. Here, the predetermined range may be a range of a positive integer including zero.

As another example, among the merge candidates included in the merge candidate list, the merge candidates of which the motion vectors are in a predetermined range may be used in deriving the combined merge candidate. Here, the predetermined range may be a range of a positive integer including zero.

As another example, among the merge candidates included in the merge candidate list, the merge candidates of which motion vector difference values between the merge candidates are in a predetermined range may be used in deriving the combined merge candidate. Here, the predetermined range may be a range of a positive integer including zero.

Here, at least one of the predetermined value and predetermined range may be determined based on a value set in the encoder/decoder in common. Also, at least one of the predetermined value and predetermined range may be determined based on a value that is entropy encoded/decoded.

Also, in deriving the modified spatial merge candidate, the modified temporal merge candidate, and the merge candidate having the predetermined motion information value, when at least one of the reference picture index and the motion vector of the merge candidate is the same as that of another merge candidate or is in a predetermined range, it may be used in deriving the combined merge candidate, that may be derived and added to the merge candidate list.

Figure 24:
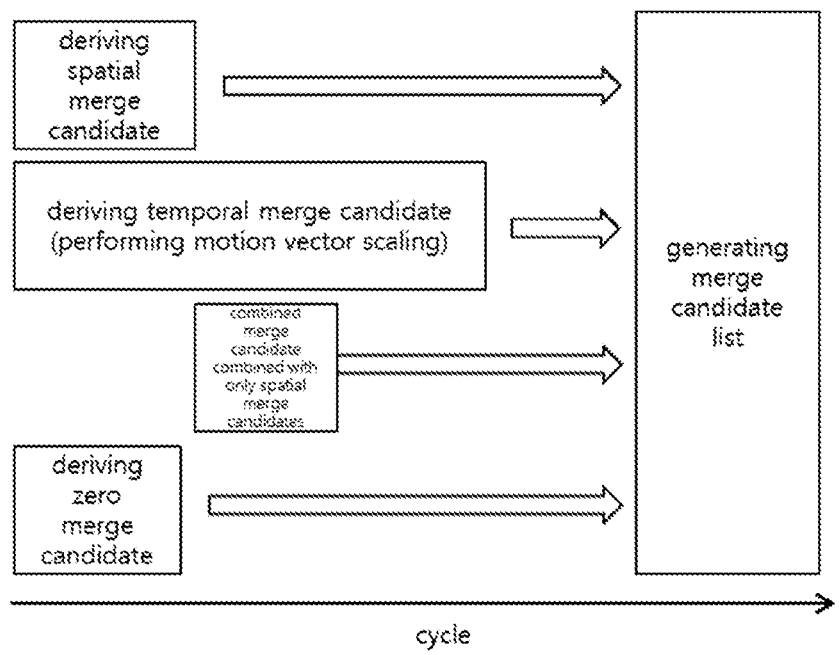
FIG. 24 is a view showing an advantage of deriving a combined merge candidate by using only spatial merge candidates in motion compensation using a merge mode.

FIG. 24 is a view showing an advantage of deriving a combined merge candidate by using only spatial merge candidates in motion compensation using a merge mode.

Referring to FIG. 24, in order to increase throughput of the merge mode in the encoder and the decoder, the combined merge candidate may be derived by using only the spatial merge candidates without using the temporal merge candidate. Compared to the spatial merge candidate derivation process, the temporal merge candidate derivation process requires relatively considerable cycle time due to motion vector scaling. Accordingly, in a case of performing the combined merge candidate derivation process after the temporal merge candidate derivation process, when motion information is determined by using the merge mode, considerable cycle time is required.

However, when deriving the combined merge candidate by using only the spatial merge candidates without using the temporal merge candidate, the combined merge candidate derivation process may be performed immediately after the spatial merge candidate derivation process which requires relatively less cycle time, compared to the temporal merge candidate derivation process. Thus, required cycle time may be reduced when determining motion information by using the merge mode, compared to a method including the temporal merge candidate derivation process.

That is, throughput of the merge mode may be enhanced by removing dependency between the temporal merge candidate derivation process and the combined merge candidate derivation process. Also, when errors occur in the reference picture due to transmission error, etc., the combined merge candidate may be derived by using only the spatial merge candidates instead of the temporal merge candidate, whereby error resiliency of the decoder may be enhanced.

Also, when using a method of deriving the combined merge candidate by using only the spatial merge candidates without using the temporal merge candidate, a method of deriving the combined merge candidate by using the temporal merge candidate and a method of deriving the combined merge candidate without using the temporal merge candidate may be performed in the same manner. The method may be realized in the same manner, and thus hardware logic may be integrated.

Figure 25:
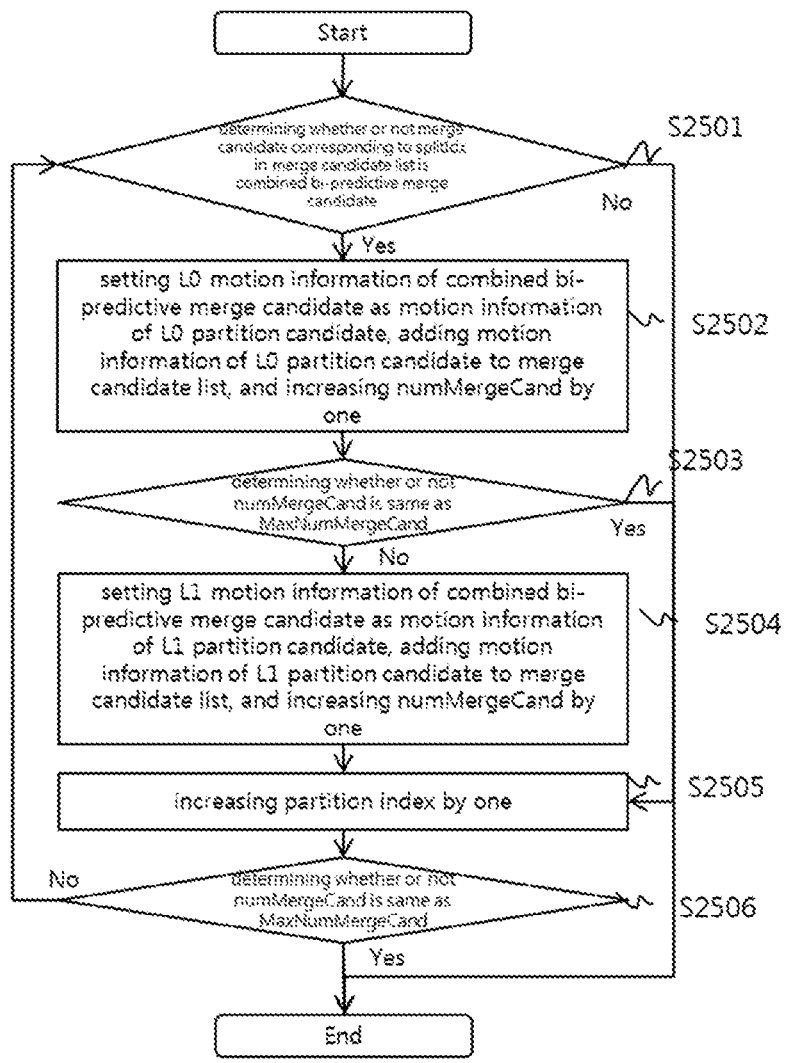
FIG. 25 is a view showing an embodiment of a method of partitioning a combined bi-predictive merge candidate.

FIG. 25 is a view showing an embodiment of a method of partitioning a combined bi-predictive merge candidate. Here, the combined bi-predictive merge candidate may be a combined merge candidate including two pieces of L0 motion information, . . . , LX motion information. Hereinafter, FIG. 25 will be described on the assumption that the combined bi-predictive merge candidate includes L0 motion information and L1 motion information.

Referring to FIG. 25, the encoder/decoder may add L0 motion information and L1 motion information being partitioned from information of the combined bi-predictive merge candidate in the merge candidate list, to the merge candidate list as new merge candidate.

Specifically, the encoder/decoder may determine the combined bi-predictive merge candidate on which partitioning is performed in the merge candidate list by using a partition index (splitIdx) at step S2501. Here, the partition index (splitIdx) may be index information indicating a combined bi-predictive merge candidate on which partitioning is performed.

The encoder/decoder may set L0 motion information of the combined bi-predictive merge candidate as motion information of L0 partition candidate, and may add the motion information to the merge candidate list, and may increase numMergeCand by one at step S2502.

The encoder/decoder may determine whether or not the number of merge candidates (numMergeCand) in the current merge candidate list is the same as the maximum number of merge candidates (MaxNumMergeCand). When they are the same at step S2503—Yes, the partitioning process may be terminated. In contrast, when they are different from each other at step S2503—No, the encoder/decoder may set L1 motion information of the combined bi-predictive merge candidate as motion information of L1 partition candidate, and may add the motion information to the merge candidate list, and may increase numMergeCand by one at step S2504. Next, the partition index (splitIdx) may be increased by one at step S2505.

Also, when the number of merge candidates (numMergeCand) in the current merge candidate list is equal to the maximum number of merge candidates (MaxNumMergeCand) at step S2506, the encoder/decoder may terminate the combined merge candidate partitioning process and, otherwise, step S2501 may be performed.

The method of partitioning the combined bi-predictive merge candidate, which partitions a bi-directional merge candidate, as shown in FIG. 25 may be performed only in a case of B slice/B picture or in a case of a slice/picture using at least M reference picture lists. Here, M may be three or four, and may mean a positive integer equal to or greater than three.

The partitioning of the combined bi-predictive merge candidate may be performed by using at least one of 1) a method of partitioning the combined bi-predictive merge candidate into uni-prediction merge candidates when the combined bi-predictive merge candidate exits, 2) a method of partitioning the combined bi-predictive merge candidate into uni-prediction merge candidates when the combined bi-predictive merge candidate exists and L0 reference picture and L1 reference picture are different from each other in the combined bi-predictive merge candidate, and 3) a method of partitioning the combined bi-predictive merge candidate into uni-prediction merge candidates when the combined bi-predictive merge candidate exists and L0 reference picture and L1 reference picture are the same in the combined bi-predictive merge candidate.

The combined bi-predictive merge candidate uses bi-prediction and motion compensation is performed by using reconstructed pixel data in at most two different reference pictures, and thus memory access bandwidth in motion compensation is large, compared to uni-prediction using reconstructed pixel data in one reference picture. Accordingly, when using partitioning of the combined bi-predictive merge candidate, the combined bi-predictive merge candidate is partitioned into uni-prediction merge candidates.

Thus, when the partitioned uni-prediction merge candidate is determined as motion information of the current block, memory access bandwidth in motion compensation may be reduced.

The encoder/decoder may derive a zero merge candidate having a zero motion vector where a motion vector is (0, 0).

The zero merge candidate may mean a merge candidate of which a motion vector of at least one piece of L0 motion information, L1 motion information, L2 motion information, and L3 motion information is (0, 0).

Also, the zero merge candidate may be at least one of two types. The first zero merge candidate may mean a merge candidate of which a motion vector is (0, 0) and a reference picture index has a value equal to or greater than zero. The second zero merge candidate may mean a merge candidate of which a motion vector is (0, 0) and a reference picture index has a value only zero.

When the number of merge candidates (numMergeCand) in the current merge candidate list is different from the maximum number of merge candidates (MaxNumMergeCand) (namely, when the merge candidate list is not full of merge candidates), at least one of the first zero merge candidate and the second zero merge candidate may be repeatedly added to the merge candidate list until the number of merge candidates (numMergeCand) is equal to the maximum number of merge candidates (MaxNumMergeCand).

Also, the first zero merge candidate may be derived and added to the merge candidate list. The second zero merge candidate may be derived and added to the merge candidate list when the merge candidate list is not full of merge candidates.

Figure 26:
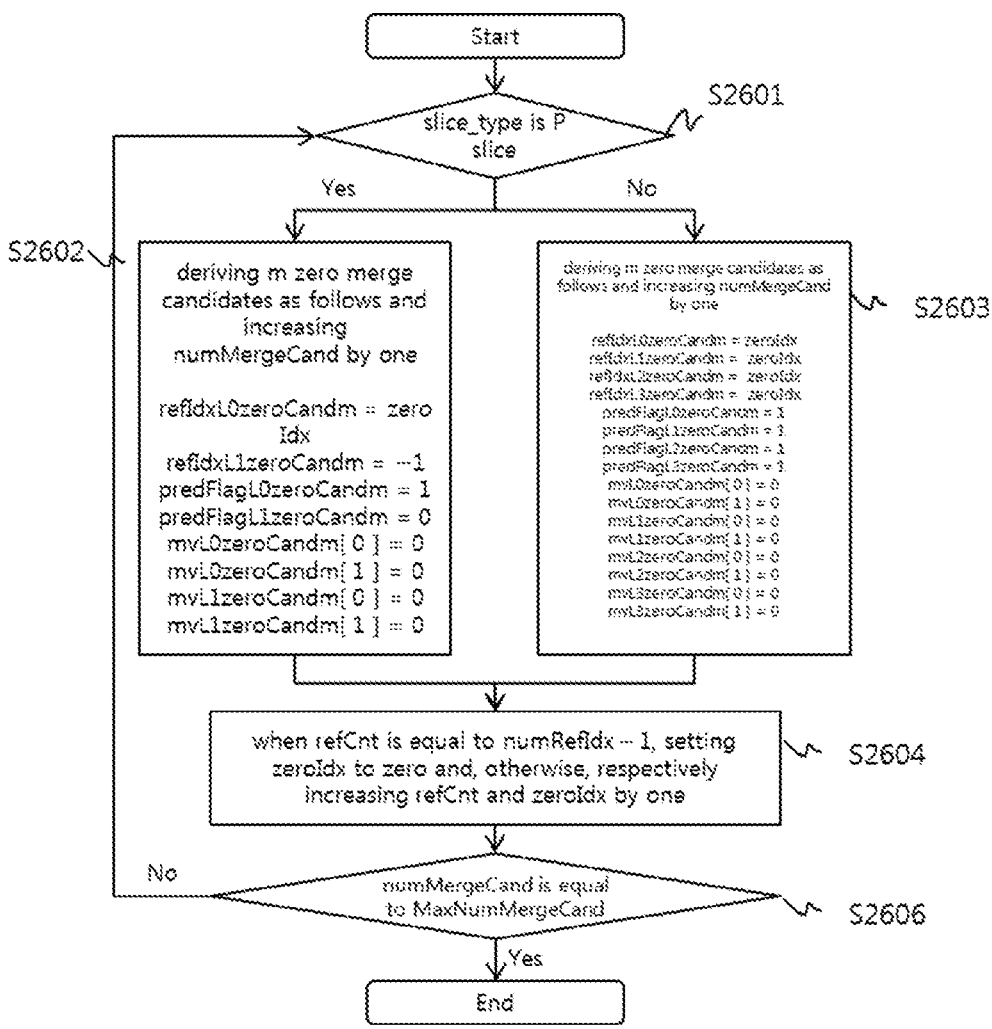
FIG. 26 is a view showing an embodiment of a method of deriving a zero merge candidate.

FIG. 26 is a view showing an embodiment of a method of deriving a zero merge candidate. When the number of merge candidates (numMergeCand) in the current merge candidate list is less than the maximum number of merge candidates (MaxNumMergeCand), the deriving of the zero merge candidate may be performed in the same order as shown in FIG. 26.

First, the encoder/decoder may set the input number of merge candidates (numInputMergeCand) as the number of merge candidates (numMergeCand) in the current merge candidate list. Also, a reference picture index (zeroIdx) of the zero merge candidate may be set to zero. Here, m-th (numMergeCand−numInputMergeCand) zero merge candidate may be derived.

The encoder/decoder may determine whether or not the slice type (slice_type) is P slice at step S2601.

When the slice type (slice_type) is P slice at step S2601—Yes, the encoder/decoder may set the number of reference pictures (numRefIdx) to the number of available reference pictures in L0 list (num_ref Idx_l0_active_minus1+1).

Also, the encoder/decoder may derive the zero merge candidate as follows and may increase numMergeCand by one at step S2602.

L0 reference picture index of m-th zero merge candidate (refIdxL0zeroCandm)=reference picture index of the zero merge candidate (zeroIdx)

L1 reference picture index of m-th zero merge candidate (refIdxL1zeroCandm)=−1

L0 prediction list utilization flag of m-th zero merge candidate (predFlagL0zeroCandm)=1

L1 prediction list utilization flag of m-th zero merge candidate (predFlagL1zeroCandm)=0 x component of L0 motion vector of m-th zero merge candidate (mvL0zeroCandm[0])=0 y component of L0 motion vector of m-th zero merge candidate (mvL0zeroCandm[1])=0 x component of L1 motion vector of m-th zero merge candidate (mvL1zeroCandm[1])=0 y component of L1 motion vector of m-th zero merge candidate (mvL1zeroCandm[1])=0

In contrast, when the slice type is not P slice (is B slice or another slice) at step S2601—No, the number of reference pictures (numRefIdx) may be set to a value less than at least one of the number of available reference pictures in L0 list (num_ref_Idx_l0_active_minus1+1), the number of available reference pictures in L1 list (num_ref Idx_l1_active_minus1+1), the number of available reference pictures in L2 list (num_ref Idx_l2_active_minus1+1), and the number of available reference pictures in L3 list (num_ref Idx_l3_active_minus1+1).

Next, the encoder/decoder may derive the zero merge candidate as follows and may increase numMergeCand by one at step S2603.

refIdxL0zeroCandm=zeroIdx
refIdxL1zeroCandm=zeroIdx
refIdxL2zeroCandm=zeroIdx
refIdxL3zeroCandm=zeroIdx
predFlagL0zeroCandm=1
predFlagL1zeroCandm=1
predFlagL2zeroCandm=1
predFlagL3zeroCandm=1
mvL0zeroCandm[0]=0
mvL0zeroCandm[1]=0
mvL1zeroCandm[0]=0
mvL1zeroCandm[1]=0
mvL2zeroCandm[0]=0
mvL2zeroCandm[1]=0
mvL3zeroCandm[0]=0
mvL3zeroCandm[1]=0

After performing step S2602 or step S2603, when reference picture count (refCnt) is equal to the number of reference pictures (numRefIdx)−1, the encoder/decoder may set the reference picture index of the zero merge candidate (zeroIdx) to zero and, otherwise, may increase refCnt and zeroIdx by one at step S2604.

Next, when numMergeCand is equal to MaxNumMergeCand at step S2605, the encoder/decoder may terminate the zero merge candidate derivation process and, otherwise, step S2601 may be performed.

When the method of deriving the zero merge candidate in FIG. 26 is performed, the derived zero merge candidate may be added to the merge candidate list as shown in FIG. 27.

Figure 28:
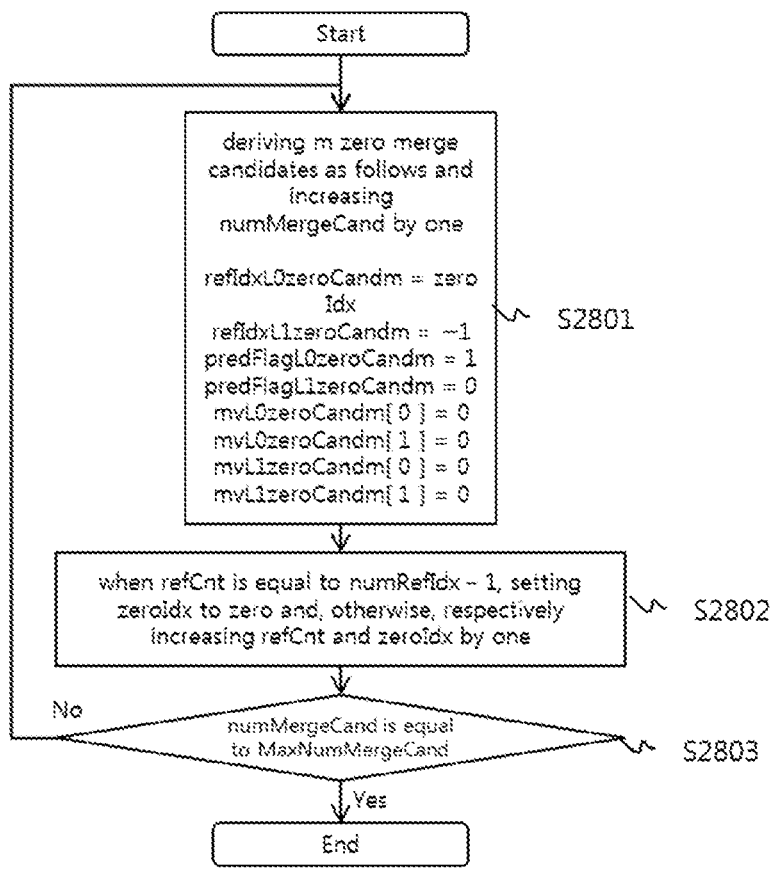
FIG. 28 is a view showing another embodiment of a method of deriving a zero merge candidate.

FIG. 28 is a view showing another embodiment of a method of deriving a zero merge candidate. When the number of merge candidates (numMergeCand) in the current merge candidate list is less than the maximum number of merge candidates (MaxNumMergeCand), the deriving of L0 uni-prediction zero merge candidate may be performed in the same order as shown in FIG. 28.

First, the encoder/decoder may set the input number of merge candidates (numInputMergeCand) as the number of merge candidates (numMergeCand) in the current merge candidate list. Also, the reference picture index of the zero merge candidate (zeroIdx) may be set to zero. Here, m-th (numMergeCand−numInputMergeCand) zero merge candidate may be derived. Also, the number of reference pictures (numRefIdx) may be set to the number of available reference pictures in L0 list (num_ref Idx_l0_active_minus1+1).

The encoder/decoder may derive the zero merge candidate as follows and may increase numMergeCand by one at step S2801.

L0 reference picture index of m-th zero merge candidate (refIdxL0zeroCandm)=reference picture index of a zero merge candidate (zeroIdx)

L1 reference picture index of m-th zero merge candidate (refIdxL1zeroCandm)=−1

L0 prediction list utilization flag of m-th zero merge candidate (predFlagL0zeroCandm)=1

L1 prediction list utilization flag of m-th zero merge candidate (predFlagL1zeroCandm)=0 x component of L0 motion vector of m-th zero merge candidate (mvL0zeroCandm[0])=0 y component of L0 motion vector of m-th zero merge candidate (mvL0zeroCandm[1])=0 x component of L1 motion vector of m-th zero merge candidate (mvL1zeroCandm[0])=0 y component of L1 motion vector of m-th zero merge candidate (mvL1zeroCandm[1])=0

When reference picture count (refCnt) is equal to numRefIdx−1, the encoder/decoder may set zeroIdx to zero and, otherwise, refCnt and zeroIdx may be increased by one at step S2802.

Next, when numMergeCand is equal to MaxNumMergeCand at step S2803—Yes, the encoder/decoder may terminate the zero merge candidate derivation step, and otherwise at step S2803—No, step S2801 may be performed.

In the method of deriving the zero merge candidate in FIG. 26, bi-prediction zero merge candidate derivation or L0 uni-prediction zero merge candidate derivation is performed depending on the slice type. Thus, two realization methods are required depending on the slice type.

In the method of deriving the zero merge candidate in FIG. 28, bi-prediction zero merge candidate derivation or L0 uni-prediction zero merge candidate derivation is not performed depending on the slice type. L0 uni-prediction zero merge candidate is derived regardless of the slice type, whereby hardware logic can be simple. Also, cycle time required in deriving the zero merge candidate can be reduced. Also, rather than a bi-prediction zero merge candidate, when the L0 uni-prediction zero merge candidate is determined as motion information of the current block, uni-prediction motion compensation is performed rather than bi-prediction motion compensation. Thus, memory access bandwidth can be reduced in motion compensation.

For example, except for a case of P slice, the L0 uni-prediction zero merge candidate may be derived and added to the merge candidate list.

The encoder/decoder may add other merge candidates except for the zero merge candidate to the merge candidate list, and then may add the L0 uni-prediction zero merge candidate. Also, the encoder/decoder may initialize the merge candidate list with the L0 uni-prediction zero merge candidate, and then may add the spatial merge candidate, the temporal merge candidate, the combined merge candidate, the zero merge candidate, the additional merge candidate, etc. to the initialized merge candidate list.

Figures 29, 30:
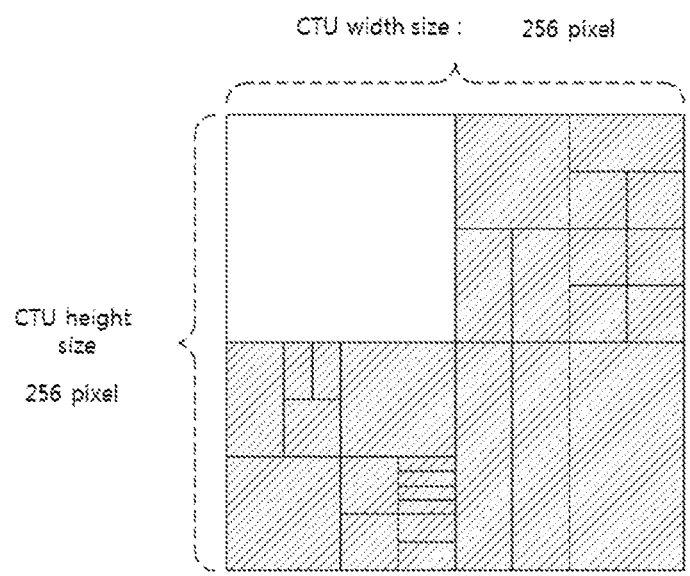

FIG. 29 is a view showing an embodiment of deriving and sharing a merge candidate list in a CTU. The merge candidate list may be shared in blocks that are smaller than a predetermined block in size or are deeper than the predetermined block in depth. Here, the size or the depth of the predetermined block may be the size or the depth of a block in which information on motion compensation is entropy encoded/decoded. Also, the size or the depth of the predetermined block may be information that is entropy encoded in the encoder and is entropy decoded in the decoder, and may be a preset value in the encoder/decoder in common.

Referring to FIG. 29, when the size of the predetermined block is 128×128, blocks smaller than 128×128 in size (blocks in the slashed area in FIG. 29) may share the merge candidate list.

Next, the determining of motion information of the current block by using the generated merge candidate list at steps S1202 and S1303 will be described in detail.

The encoder may determine a merge candidate being used in motion compensation among merge candidates in the merge candidate list through motion estimation, and may encode a merge candidate index (merge_idx) indicating the determined merge candidate in a bitstream.

In the meantime, in order to generate the prediction block, the encoder may select a merge candidate from the merge candidate list based on the merge candidate index to determine motion information of the current block. Here, the prediction block of the current block may be generated by performing motion compensation based on the determined motion information.

For example, when the merge candidate index is three, a merge candidate of the merge candidate list indicated by the merge candidate index 3 may be determined as motion information, and may be used in motion compensation of an encoding target block.

The decoder may decode the merge candidate index in the bitstream to determine a merge candidate of the merge candidate list indicated by the merge candidate index. The determined merge candidate may be determined as motion information of the current block. The determined motion information may be used in motion compensation of the current block. Here, motion compensation may mean inter prediction.

For example, when the merge candidate index is two, a merge candidate of the merge candidate list indicated by the merge candidate index 2 may be determined as motion information, and may be used in motion compensation of a decoding target block.

Also, by changing at least one value of information corresponding to motion information of the current block, the motion information may be used in inter prediction or motion compensation of the current block. Here, the changed value of information corresponding to motion information may be at least one of x component of the motion vector, y component of the motion vector, and the reference picture index. Also, when changing at least one value of information corresponding to motion information, at least one value of information corresponding to motion information may be changed so as to indicate the minimum distortion by using a distortion calculation method (SAD, SSE, MSE, etc.).

Next, the performing of motion compensation of the current block by using the determined motion information at steps S1203 and S1304 will be described in detail.

The encoder and decoder may perform inter prediction or motion compensation by using motion information of the determined merge candidate. Here, the current block (encoding/decoding target block) may have motion information of the determined merge candidate.

The current block may have at least one to at most N pieces of motion information according to prediction direction. At least one to at most N prediction blocks may be generated by using motion information to derive the final prediction block of the current block.

For example, when the current block has one piece of motion information, the prediction block generated by using the motion information may be determined as the final prediction block of the current block.

In contrast, when the current block has several pieces of motion information, several prediction blocks may be generated by using the several pieces of motion information, and the final prediction block of the current block may be determined based on a weighted sum of the several prediction blocks. Reference pictures respectively including the several prediction blocks indicated by several pieces of motion information may be included in different reference picture lists, and may be included in the same reference picture list. Also, when the current block has several pieces of motion information, several pieces of motion information of several reference pictures may indicate the same reference picture.

For example, a plurality of prediction blocks may be generated based on at least one of the spatial merge candidate, the temporal merge candidate, the modified spatial merge candidate, the modified temporal merge candidate, the merge candidate having the predetermined motion information value or the combined merge candidate, and the additional merge candidate. The final prediction block of the current block may be determined based on the weighted sum of the plurality of prediction blocks.

As another example, a plurality of prediction blocks may be generated based on merge candidates indicated by a preset merge candidate index. The final prediction block of the current block may be determined based on the weighted sum of the plurality of prediction blocks. Also, a plurality of prediction blocks may be generated based on merge candidates that exist in a preset merge candidate index range. The final prediction block of the current block may be determined based on the weighted sum of the plurality of prediction blocks.

The weighting factor applied to each prediction block may have the same value by 1/N (here, N is the number of generated prediction blocks). For example, when two prediction blocks are generated, the weighting factor being applied to each prediction block may be 1/2. When three prediction blocks are generated, the weighting factor being applied to each prediction block may be 1/3. When four prediction blocks are generated, the weighting factor being applied to each prediction block may be 1/4. Alternatively, the final prediction block of the current block may be determined by applying different weighting factors to prediction blocks.

The weighting factor does not have to have a fixed value for each prediction block, and may have a variable value for each prediction block. Here, the weighting factors being applied to prediction blocks may be the same, and may be different from each other. For example, when two prediction blocks are generated, weighting factors being applied to the two prediction blocks may be a variable value for each block such as (1/2, 1/2), (1/3, 2/3), (1/4, 3/4), (2/5, 3/5), (3/8, 5/8), etc. In the meantime, the weighting factor may be a positive real number and a negative real number. For example, the weighting factor may be a negative real number such as (−1/2, 3/2), (−1/3, 4/3), (−1/4, 5/4), etc.

In the meantime, in order to apply a variable weighting factor, at least one piece of weighting factor information for the current block may be signaled through a bitstream. The weighting factor information may be signaled for each prediction block, and may be signaled for each reference picture. A plurality of prediction blocks may share one piece of weighting factor information.

The encoder and the decoder may determine whether or not motion information of the merge candidate is used based on a prediction block list utilization flag. For example, when a prediction block list utilization flag indicates one, which is a first value, for each reference picture list, it may indicate that the encoder and the decoder can use motion information of the merge candidate of the current block to perform inter prediction or motion compensation. When a prediction block list utilization flag indicates zero which is a second value, it may indicate that the encoder and the decoder do not perform inter prediction or motion compensation by using motion information of the merge candidate of the current block. In the meantime, the first value of the prediction block list utilization flag may be set to zero, and the second value thereof may be set to one.

The following formula 3 to formula 5 show examples of generating the final prediction block of the current block, when the inter-prediction indicator of each current block is PRED_BI (or when the current block can use two pieces of motion information), PRED_TRI (or when the current block can use three pieces of motion information), and PRED_QUAD (or when the current block can use four pieces of motion information) and prediction direction for each reference picture list is uni-direction.

$$P\_BI(WF\_L0*P\_L0+OFFSET\_L0+WF\_L1*P\_L1+OFFSET\_L1+RF)>>1 \quad [\text{Formula 3}]$$

$$P\_TRI=(WF\_L0*P\_L0+OFFSET\_L0+WF\_L1*P\_L1+OFFSET\_L1+WF\_L2*P\_L2+OFFSET\_L2+RF)/3 \quad [\text{Formula 4}]$$

$$P\_QUAD-(WF\_L0*P\_L0+OFFSET\_L0+WF\_L1*P\_L1+OFFSET\_L1+WF\_L2*P\_L2+OFFSET\_L2+WF\_L3*P\_L3+OFFSET\_L3+RF)>>2 \quad [\text{Formula 5}]$$

In formulas 3 to 5, the final prediction block of the current block may be designated as P_BI, P_TRI, and P_QUAD, and the reference picture list may be designated as LX (X=0, 1, 2, 3). A weighting factor value of the prediction block generated by using LX may be designated as WF_LX. An offset value of the prediction block generated by using LX may be designated as OFFSET_LX. A prediction block generated by using motion information for LX of the current block may be designated as P_LX. A rounding factor may be designated as RF, and may be set to zero, a positive number, or a negative number. The LX reference picture list may include at least one of a long-term reference picture, a reference picture on which deblocking filter is not performed, a reference picture on which sample adaptive offset is not performed, a reference picture on which adaptive loop filter is not performed, a reference picture on which deblocking filter and adaptive offset are performed, a reference picture on which deblocking filter and adaptive loop filter is performed, a reference picture on which sample adaptive offset and adaptive loop filter are performed, a reference picture on which deblocking filter, sample adaptive offset, and adaptive loop filter are performed. In this case, the LX reference picture list may be at least one of an L0 reference picture list, an L1 reference picture list, an L2 reference picture list, and an L3 reference picture list.

When the prediction direction for a predetermined reference picture list is a plurality of directions, the final prediction block for the current block may be obtained based on the weighted sum of the prediction blocks. Here, weighting factors being applied to prediction blocks derived from the same reference picture list may have the same value, and may have different values.

At least one of a weighting factor (WF_LX) and an offset (OFFSET_LX) for a plurality of prediction blocks may be a coding parameter being entropy encoded/decoded.

As another example, a weighting factor and an offset may be derived from an encoded/decoded neighbor block adjacent to the current block. Here, the neighbor block of the current block may include at least one of a block being used in deriving the spatial merge candidate of the current block and a block being used in deriving the temporal merge candidate of the current block.

As another example, a weighting factor and an offset may be determined based on a display order (POC) of the current picture and reference pictures. In this case, when the current picture is far from the reference picture, the weighting factor or the offset may be set to a small value. When the current picture is close to the reference picture, the weighting factor or the offset may be set to a large value. For example, when the POC difference between the current picture and L0 reference picture is two, the weighting factor value being applied to the prediction block generated by referring to L0 reference picture may be set to 1/3. In contrast, when the POC difference between the current picture and L0 reference picture is one, the weighting factor value being applied to the prediction block generated by referring to L0 reference picture may be set to 2/3. As described above, the weighting factor or offset value may be in inverse proportion to the display order difference between the current picture and the reference picture. As another example, the weighting factor or offset value may be in proportion to the display order difference between the current picture and the reference picture.

As another example, based on at least one of coding parameters of the current block, the neighbor block, and the collocated block, at least one of a weighting factor and an offset may be entropy encoded/decoded. Also, based on at least one of coding parameters of the current block, the neighbor block, and the collocated block, the weighted sum of prediction blocks may be calculated.

The weighted sum of a plurality of prediction blocks may be applied to only a partial area in the prediction block. Here, the partial area may be an area corresponding to the boundary in the prediction block. As described above, in order to apply the weighted sum to only the partial area, the weighted sum may be applied for each sub-block of the prediction block.

Next, the entropy encoding/decoding of information on motion compensation at steps S1204 and S1301 will be described in detail.

FIGS. 30 and 31 are views showing examples of syntax of information on motion compensation. FIG. 30 shows an example of syntax of information on motion compensation in a coding unit (coding_unit). FIG. 31 shows an example of syntax of information on motion compensation in a prediction unit (prediction_unit).

The encoding apparatus may entropy encode information on motion compensation through a bitstream, and the decoding apparatus may entropy decode information on motion compensation included in the bitstream. Here, information on motion compensation being entropy encoded/decoded may include at least one of information on whether or not a skip mode is used (cu_skip_flag), information on whether or not a merge mode is used (merge_flag), merge index information (merge_index), an inter-prediction indicator (inter_pred_idc), a weighting factor value (wf_l0, wf_l1, wf_l2, wf_l3), and an offset value (offset_l0, offset_l1, offset_l2, offset_l3). Information on motion compensation may be entropy encoded/decoded in at least one of a CTU, a coding block, and a prediction block.

When information on whether or not a skip mode is used (cu_skip_flag) has one which is a first value, it may indicate the use of the skip mode. When it has two which is a second value, it may not indicate the use of the skip mode. Motion compensation of the current block may be performed by using the skip mode based on the information on whether or not a skip mode is used.

When information on whether or not a merge mode is used (merge_flag) has one which is a first value, it may indicate the use of the merge mode. When it has zero which is a second value, it may not indicate the use of the merge mode. Motion compensation of the current block may be performed by using the merge mode based on the information on whether or not a merge mode is used.

The merge index information (merge_index) may mean information indicating a merge candidate in the merge candidate list.

Also, the merge index information may mean information on a merge index.

Also, the merge index information may indicate a block, which derived a merge candidate, among reconstructed blocks spatially/temporally adjacent to the current block.

Also, the merge index information may indicate at least one piece of motion information of the merge candidate. For example, when the merge index information has zero that is a first value, it may indicate the first merge candidate in the merge candidate list. When it has one that is a second value, it may indicate the second merge candidate in the merge candidate list. When it has two that is a third value, it may indicate the third merge candidate in the merge candidate list. In the same manner, when it has a fourth value to N-th value, it may indicate a merge candidate corresponding to the value according to the order in the merge candidate list. Here, N may mean a positive integer including zero.

Motion compensation of the current block may be performed by using the merge mode based on merge mode index information.

When the current block is encoded/decoded in inter prediction, the inter-prediction indicator may mean at least one of inter prediction direction and the number of prediction directions of the current block. For example, the inter-prediction indicator may indicate uni-directional prediction, or multi-directional prediction such as bi-directional prediction, tri-directional prediction, quad-directional prediction, etc. The inter-prediction indicator may mean the number of reference pictures being used when the current block generates the prediction block. Alternatively, one reference picture may be used for multi-directional prediction. In this case, M reference pictures are used to perform N(N>M)-directional prediction. The inter-prediction indicator may mean the number of prediction blocks being used in performing motion compensation or inter prediction for the current block.

As described above, according to the inter-prediction indicator, the number of reference pictures being used in generating the prediction block of the current block, the number of prediction blocks being used in performing inter prediction or motion compensation of the current block, or the number of reference picture lists available to the current block, etc. may be determined. Here, the number of reference picture lists is N that is a positive integer such as 1, 2, 3, 4 or more. For example, the reference picture list may include L0, L1, L2, L3, etc. Motion compensation may be performed on the current block by using at least one reference picture list.

For example, the current block may generate at least one prediction block by using at least one reference picture list to perform motion compensation of the current block. For example, one or more prediction blocks may be generated by using reference picture list L0 to perform motion compensation. Alternatively one or more prediction blocks may be generated by using reference picture lists L0 and L1 to perform motion compensation. Alternatively, one or more prediction block or at most N prediction blocks (here, N is a positive integer equal to or greater than three or two) may be generated by using reference picture lists L0, L1 and L2 to perform motion compensation. Alternatively, one or more prediction blocks or at most N prediction blocks (here, N is a positive integer equal to or greater than four or two) may be generated by using reference picture lists L0, L1, L2 and L3 to perform motion compensation of the current block.

The reference picture indicator may indicate uni-direction (PRED_LX), bi-direction (PRED_BI), tri-direction (PRED_TRI), quad-direction (PRED_QUAD) or greater direction depending on the number of prediction directions of the current block.

For example, when uni-directional prediction is performed for each reference picture list, the inter-prediction indicator PRED_LX may mean that one prediction block is generated by using a reference picture list LX (X is an integer such as 0, 1, 2, or 3, etc.) and inter prediction or motion compensation is performed by using the generated one prediction block. The inter-prediction indicator PRED_BI may mean that two prediction blocks are generated by using at least one of L0, L1, L2 and L3 reference picture lists and inter prediction or motion compensation is performed by using the generated two prediction blocks. The inter-prediction indicator PRED_TRI may mean that three prediction blocks are generated by using at least one of L0, L1, L2, and L3 reference picture lists and inter prediction or motion compensation is performed by using the generated three prediction blocks. The inter-prediction indicator PRED_QUAD may mean that four prediction blocks are generated by using at least one of L0, L1, L2, and L3 reference picture lists and inter prediction or motion compensation is performed by using the generated four prediction blocks. That is, the sum of the number of prediction blocks used in performing inter prediction of the current block may be set to the inter-prediction indicator.

When performing multi-directional prediction for the reference picture list, the inter-prediction indicator PRED_BI may mean performing bi-directional prediction for the L0 reference picture list. The inter-prediction indicator PRED_TRI may mean: performing tri-directional prediction for the L0 reference picture list; performing uni-directional prediction for the L0 reference picture list, and performing bi-directional prediction for the L1 reference picture list; or performing bi-directional prediction for the L0 reference picture list and performing uni-directional prediction for the L1 reference picture list.

As described above, the inter-prediction indicator may mean that at least one to at most N (here, N is the number of prediction directions indicated by the inter-prediction indicator) prediction blocks are generated from at least one reference picture list so as to perform motion compensation. Alternatively, the inter-prediction indicator may mean that at least one to at most N prediction blocks are generated from N reference pictures and motion compensation for the current block is performed by using the generated prediction block.

For example, the inter-prediction indicator PRED_TRI may mean that three prediction blocks are generated by using at least one of L0, LL L2, and L3 reference picture lists so as to perform inter prediction or motion compensation of the current block. Alternatively, the inter-prediction indicator PRED_TRI may mean that three prediction blocks are generated by using at least three selected from the group consisting of L0, LL L2, and L3 reference picture lists so as to perform inter prediction or motion compensation of the current block. Also, the inter-prediction indicator PRED_QUAD may mean that four prediction blocks are generated by using at least one of L0, LL L2, and L3 reference picture lists so as to perform inter prediction or motion compensation of the current block. Alternatively, the inter-prediction indicator PRED_QUAD may mean that four prediction blocks are generated by using at least four selected from the group consisting of L0, LL L2, and L3 reference picture lists so as to perform inter prediction or motion compensation of the current block.

Available inter prediction directions may be determined according to the inter-prediction indicator, and all or some of the available inter-prediction directions may be selectively used based on the size and/or shape of the current block.

A prediction list utilization flag indicates whether or not the prediction block is generated by using the reference picture list.

For example, when the prediction list utilization flag indicates one which is a first value, it may indicate that the prediction block is generated by using the reference picture list. When it indicates zero which is a second value, it may indicate that the prediction block is not generated by using the reference picture list. Here, the first value of the prediction list utilization flag may be set to zero, and the second value thereof may be set to one.

That is, when the prediction list utilization flag indicates the first value, the prediction block of the current block may be generated by using motion information corresponding to the reference picture list.

In the meantime, the prediction list utilization flag may be set based on the inter-prediction indicator. For example, when the inter-prediction indicator indicates PRED_LX, PRED_BI, PRED_TRI or PRED_QUAD, the prediction list utilization flag predFlagLX may be set to one which is a first value. When the inter-prediction indicator is PRED_LN (N is a positive integer other than X), the prediction list utilization flag predFlagLX may be set to zero which is a second value.

Also, the inter-prediction indicator may be set based on the prediction list utilization flag. For example, when the prediction list utilization flag predFlagL0 and the predFlagL1 indicate one which is a first value, the inter-prediction indicator may be set to PRED_BI. For example, when only the prediction list utilization flag predFlagL0 indicate one which is a first value, the inter-prediction indicator may be set to PRED_L0.

When two or more prediction blocks are generated during motion compensation for the current block, the final prediction block for the current block may be generated through a weighted sum for each prediction block. When calculating the weighted sum, at least one of a weighting factor and an offset may be applied for each prediction block. A weighted sum factor such as the weighting factor or the offset, etc. used in calculating the weighted sum may be entropy encoded/decoded for at least one of a reference picture list, a reference picture, a motion vector candidate index, a motion vector difference, a motion vector, information on whether or not a skip mode is used, information on whether or not a merge mode is used, merge index information. Also, the weighted sum factor of each prediction block may be entropy encoded/decoded based on the inter-prediction indicator. Here, the weighted sum factor may include at least one of the weighting factor and the offset.

The weighted sum factor may be derived by index information specifying one of predetermined sets in the encoding apparatus and the decoding apparatus. In this case, index information for specifying at least one of the weighting factor and the offset may be entropy encoded/decoded. The predetermined set in the encoder and the decoder may be respectively defined for a weighting factor and an offset. The predetermined set may include at least one weighting factor candidate or at least one offset candidate. Alternatively, a table defining the mapping relation between the weighting factor and the offset may be used. In this case, the weighting factor value and the offset value for the prediction block may be obtained from the table by using one piece of index information. Index information on the offset mapped to each piece of index information for the weighting factor being entropy encoded/decoded may be entropy encoded/decoded.

Information related to the weighted sum factor may be entropy encoded/decoded by a block unit, and may be entropy encoded/decoded at a higher level. For example, the weighting factor or the offset may be entropy encoded/decoded by a block unit such as a CTU, a CU, or a PU, etc., or may be entropy encoded/decoded at a higher level such as a video parameter set, a sequence parameter set, a picture parameter set, an adaptation parameter set, or a slice header, etc.

The weighted sum factor may be entropy encoded/decoded based on a weighted sum factor difference value between a weighted sum factor and a weighted sum factor prediction value. For example, a weighting factor prediction value and a weighting factor difference value may be entropy encoded/decoded, or an offset prediction value and an offset difference value may be entropy encoded/decoded. Here, the weighting factor difference value may indicate a difference value between the weighting factor and the weighting factor prediction value, and the offset difference value may indicate a difference value between the offset and the offset prediction value.

Here, the weighted sum factor difference value may be entropy encoded/decoded by a block unit, and the weighted sum factor prediction value may be entropy encoded/decoded at a higher level. When the weighted sum factor prediction value such as the weighting factor prediction value or the offset prediction value, etc. is entropy encoded/decoded by a picture or a slice unit, blocks included in the picture or the slice may use a common weighted sum factor prediction value.

The weighted sum factor prediction value may be derived through a particular area within an image, a slice or a tile or through a particular area within a CTU or a CU. For example, the weighting factor value or the offset value of the particular area within an image, a slice, a tile, a CTU, or a CU may be used as the weighting factor prediction value or the offset prediction value. In this case, entropy encoding/decoding of the weighted sum factor prediction value may be omitted, and entropy encoding/decoding of only the weighted sum factor difference value may be performed.

Alternatively, the weighted sum factor prediction value may be derived from an encoded/decoded neighbor block adjacent to the current block. For example, the weighting factor value or the offset value of the encoded/decoded neighbor block adjacent to the current block may be set to the weighting factor prediction value or the offset prediction value of the current block. Here, the neighbor block of the current block may include at least one of a block used in deriving the spatial merge candidate and a block used in deriving the temporal merge candidate.

When using the weighting factor prediction value and the weighting factor difference value, the decoding apparatus may calculate a weighting factor value for the prediction block by adding the weighting factor prediction value and the weighting factor difference value. Also, when using the offset prediction value and the offset difference value, the decoding apparatus may calculate an offset value for the prediction block by adding the offset prediction value and the offset difference value.

The weighted sum factor or the weighted sum factor difference value may be entropy encoded/decoded based on at least one of coding parameters of the current block, the neighbor block, and the collocated block.

Based on at least one of coding parameters of the current block, the neighbor block, and the collocated block, the weighted sum factor, the weighted sum factor prediction value, or the weighted sum factor difference value may be derived as a weighted sum factor, a weighted sum factor prediction value, or a weighted sum factor difference value of the current block.

Instead of entropy encoding/decoding information on a weighted sum factor of the current block, a weighted sum factor of an encoded/decoded block adjacent to the current block may be used as a weighted sum factor of the current block. For example, the weighting factor or the offset of the current block may be set to have the same value as the weighting factor or the offset of the encoded/decoded neighbor block adjacent to the current block.

Motion compensation may be performed on the current block by using at least one of weighted sum factors, or may be performed by using at least one of derived weighted sum factors.

The weighted sum factor may be included in information on motion compensation.

At least one piece of the above-described information on motion compensation may be entropy encoded/decoded in at least one of a CTU and a sub-unit of a CTU (sub-CTU). Here, the sub-unit of the CTU may include at least one of a CU and a PU. A block of the sub-unit of the CTU may have a square shape or a non-square shape. Information on motion compensation may mean at least one piece of information on motion compensation for convenience.

When information on motion compensation is entropy encoded/decoded in the CTU, motion compensation may be performed on all or a part of blocks existing in the CUT by using information on the motion compensation according to a value of information on motion compensation.

When information on motion compensation is entropy encoded/decoded in the CTU or the sub-unit of the CTU, information on motion compensation may be entropy encoded/decoded based on at least one of the size and the depth of the predetermined block.

Here, information on the size or the depth of the predetermined block may be entropy encoded/decoded. Alternatively, information on the size or the depth of the predetermined block may be determined based on at least one of a preset value in the encoder and the decoder and a coding parameter or based at least one of another syntax element values.

Information on motion compensation may be entropy encoded/decoded in only a block that is larger than or equal to the predetermined block in size, and information on motion compensation may not be entropy encoded/decoded in a block that is smaller than the predetermined block in size. In this case, motion compensation may be performed on sub-blocks in a block that is larger than or equal to the predetermined block in size based on information on motion compensation that is entropy encoded/decoded in a block that is larger than or equal to the predetermined block in size. That is, sub-blocks in a block that is larger than or equal to the predetermined block in size may share information on motion compensation including a motion vector candidate, a motion vector candidate list, a merge candidate, a merge candidate list, etc.

Information on motion compensation may be entropy encoded/decoded in only a block that is shallower than or equal to the predetermined block in depth, and information on motion compensation may not be entropy encoded/decoded in a block that is deeper than the predetermined block in depth. In this case, motion compensation may be performed on sub-blocks in a block that is shallower than or equal to the predetermined block in depth based on information on motion compensation entropy encoded/decoded in a block that is shallower than or equal to the predetermined block in depth. That is, sub-blocks in a block that is shallower than or equal to the predetermined block in depth may share information on motion compensation including a motion vector candidate, a motion vector candidate list, a merge candidate, a merge candidate list, etc.

For example, when information on motion compensation is entropy encoded/decoded in the sub-unit, of which the size is 32×32, of the CTU, of which the block size is 64×64, motion compensation may be performed on a block that is included in a 32×32-size block and is smaller than the 32×32-size block in size based on information on motion compensation that is entropy encoded/decoded in the 32×32-size block.

As another example, when information on motion compensation is entropy encoded/decoded in the sub-unit, of which the size is 16×16, of the CTU, of which the block size is 128×128, motion compensation may be performed on a block that is included in a 16×16-size block and is smaller than or equal to the 16×16-size block in size based on information on motion compensation that is entropy encoded/decoded in the 16×16-size block.

As another example, when information on motion compensation is entropy encoded/decoded in the sub-unit, of which the block depth is one, of the CTU, of which the block depth is zero, motion compensation may be performed on a block that is included in a one-depth block and is deeper than the one-depth block in depth based on information on motion compensation that is entropy encoded/decoded in the one-depth block.

For example, when at least one piece of information on motion compensation is entropy encoded/decoded in the sub-unit, of which the block depth is two, of the CTU, of which the block depth is zero, motion compensation may be performed on a block that is included in a two-depth block and is equal to or is deeper than the two-depth block in depth based on information on motion compensation that is entropy encoded/decoded in the two-depth block.

Here, the value of the block depth may be a positive integer including zero. When the value of the block depth is large, it may mean that the depth is deep. When the value of the block depth is small, it may mean that the depth is shallow. Accordingly, when the value of the block depth is large, the block size may be small. When the value of the block depth is small, the block size may be large. Also, a sub-block of a predetermined block may be deeper than the predetermined block in depth, and a sub-block of a predetermined block may be deeper than the predetermined block in depth within a block corresponding to the predetermined block.

Information on motion compensation may be entropy encoded/decoded for each block, and may be entropy encoded/decoded at a higher level. For example, information on motion compensation may be entropy encoded/decoded for each block such as a CTU, a CU, or a PU, etc., or may be entropy encoded/decoded at a higher lever such as a Video Parameter Set, a Sequence Parameter Set, a Picture Parameter Set, an Adaptation Parameter Set or a slice Header, etc.

Information on motion compensation may be entropy encoded/decoded based on an information difference value on motion compensation indicating a difference value between information on motion compensation and an information prediction value on motion compensation. Considering the inter-prediction indicator which is one piece of information on motion compensation as an example, the inter-prediction indicator prediction value and the inter-prediction indicator difference value may be entropy encoded/decoded. Here, the inter-prediction indicator difference value may be entropy encoded/decoded for each block, and the inter-prediction indicator prediction value may be entropy encoded/decoded at a higher level. The information prediction value on motion compensation such as the inter-prediction indicator prediction value, etc. is entropy encoded/decoded for each picture or slice, blocks in the picture or the slice may use a common information prediction value on motion compensation.

The information prediction value on motion compensation may be derived through a particular area within an image, a slice or a tile, or through a particular area within a CTU or a CU. For example, the inter-prediction indicator of the particular area in the image, slice, tile, CTU, or CU may be used as the inter-prediction indicator prediction value. In this case, entropy encoding/decoding of the information prediction value on motion compensation may be omitted, and only the information difference value on motion compensation may be entropy encoded/decoded.

Alternatively, the information prediction value on motion compensation may be derived from an encoded/decoded neighbor block adjacent to the current block. For example, the inter-prediction indicator of the encoded/decoded neighbor block adjacent to the current block may be set to the inter-prediction indicator prediction value of the current block. Here, the neighbor block of the current block may include at least one of a block used in deriving the spatial merge candidate and a block used in deriving the temporal merge candidate. Also, the neighbor block may have the same depth as or the smaller depth than that of the current block. When there is a plurality of neighbor blocks, one may be selectively used according to the predetermined priority. The neighbor block used to predict information on motion compensation may have a fixed position based on the current block, and may have a variable position according to the position of the current block. Here, the position of the current block may be a position based on a picture or a slice including the current block, or may be a position based on a position of a CTU, a CU, or a PU including the current block.

The merge index information may be calculated by using index information in the predetermined sets in the encoder and the decoder.

When using the information prediction value on motion compensation and the information difference value on motion compensation, the decoding apparatus may calculate an information value on motion compensation for the prediction block by adding the information prediction value on motion compensation and the information difference value on motion compensation.

Information on motion compensation or the information difference value on motion compensation may be entropy encoded/decoded based on at least one of coding parameters of the current block, the neighbor block, and the collocated block.

Based on at least one of coding parameters of the current block, the neighbor block, and the collocated block, information on motion compensation, information prediction value on motion compensation, or information difference value on motion compensation may be derived as information on motion compensation, information prediction value on motion compensation or information difference value on motion compensation of the current block.

Instead of entropy encoding/decoding information on motion compensation of the current block, information on motion compensation of the encoded/decoded block adjacent to the current block may be used as information on motion compensation of the current block. For example, the inter-prediction indicator of the current block may be set to the same value as the inter-prediction indicator of the encoded/decoded neighbor block adjacent to the current block.

Also, at least one piece of information on motion compensation may have a fixed value preset in the encoder and the decoder. The preset fixed value may be determined as a value for at least one piece of information on motion compensation. Blocks which are smaller than a particular block in size within the particular block may share at least one piece of information on motion compensation having the preset fixed value. In the same manner, blocks which are deeper than a particular block in depth and are sub-blocks of the particular block may share at least one piece of information on motion compensation having the preset fixed value. Here, the fixed value may be a positive integer including zero, or may be an integer vector value including (0, 0).

Here, sharing at least one piece of information on motion compensation may mean that blocks have the same value for at least one piece of information on motion compensation, or that motion compensation is performed on the blocks by using the same value for at least one piece of information on motion compensation.

Information on motion compensation may further include at least one of a motion vector, a motion vector candidate, a motion vector candidate index, a motion vector difference value, a motion vector prediction value, information on whether or not a skip mode is used (skip_flag), information on whether or not a merge mode is used (merge_flag), merge index information (merge_index), motion vector resolution information, overlapped block motion compensation information, local illumination compensation information, affine motion compensation information, decoder-side motion vector derivation information, and bi-directional optical flow information.

Motion vector resolution information may be information indicating whether or not particular resolution is used for at least one of a motion vector and a motion vector difference value. Here, resolution may mean precision. Also, particular resolution may set to at least one of an integer-pixel (integer-pel) unit, a 1/2-pixel (1/2-pel) unit, a 1/4-pixel (1/4-pel) unit, a 1/8-pixel (1/8-pel) unit, a 1/16-pixel (1/16-pel) unit, a 1/32-pixel (1/32-pel) unit, and a 1/64-pixel (1/64-pel) unit.

Overlapped block motion compensation information may be information indicating whether or not the weighted sum of the prediction block of the current block is calculated by using a motion vector of the neighbor block spatially adjacent to the current block during motion compensation of the current block.

Local illumination compensation information may be information indicating whether or not at least one of a weighting factor value and an offset value is applied when generating the prediction block of the current block. Here, at least one of the weighting factor value and the offset value may be a value calculated based on a reference block.

Affine motion compensation information may be information indicating whether or not an affine motion model is used during motion compensation of the current block. Here, the affine motion model may be a model for partitioning one block into several sub-blocks by using a plurality of parameters, and calculating motion vectors of the partitioned sub-blocks by using representative motion vectors.

Decoder-side motion vector derivation information may be information indicating whether or not a motion vector required for motion compensation is used by being derived by the decoder. Information on a motion vector may not be entropy encoded/decoded based on decoder-side motion vector derivation information. Also, when decoder-side motion vector derivation information indicates that the decoder derives and uses a motion vector, information on a merge mode may be entropy encoded/decoded. That is, decoder-side motion vector derivation information may indicate whether or not a merge mode is used in the decoder.

Bi-directional optical flow information may be information indicating whether or not motion compensation is performed by correcting a motion vector for each pixel or sub-block. Based on bi-directional optical flow information, a motion vector for each pixel or sub-block may not be entropy encoded/decoded. Here, motion vector correction may be modifying a motion vector value from a motion vector for each block into a motion vector for each pixel or sub-block.

Motion compensation is performed on the current block by using at least one piece of information on motion compensation, and at least one piece of information on motion compensation may be entropy encoded/decoded.

Figure 32:
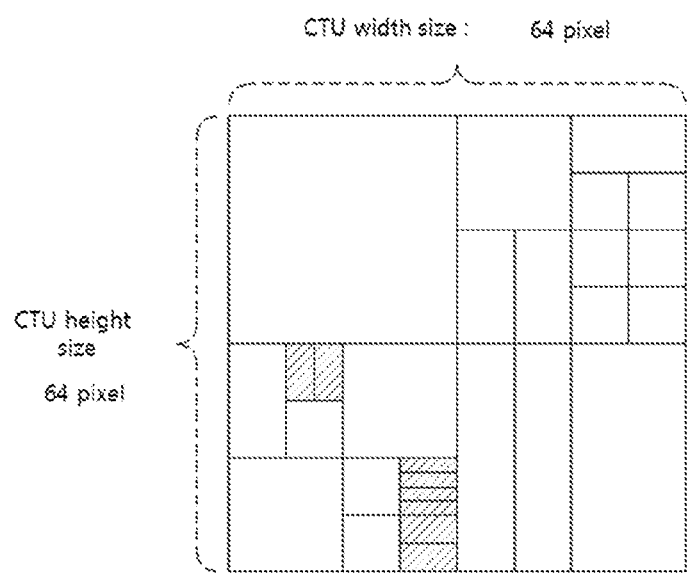
FIG. 32 is a view showing an embodiment of using a merge mode in blocks, which are smaller than a predetermined block in size, of a CTU.

FIG. 32 is a view showing an embodiment of using a merge mode in blocks, which are smaller than a predetermined block in size, of a CTU.

Referring to FIG. 32, when the size of the predetermined block is 8×8, blocks smaller than 8×8 (slashed blocks) may use the merge mode.

In the meantime, when comparing the sizes between blocks, being smaller than the predetermined block in size may mean that the sum of samples in the block is small. For example, a 32×16-size block may have 512 samples, and thus the 32×16-size block is smaller than a 32×32-size block having 1024 samples. A 4×16-size block may have 64 samples, and thus the 4×16-size block may be equal to a 8×8 block in size.

When entropy encoding/decoding information on motion compensation, a binarization method such as a truncated rice binarization method, a K-th order Exp_Golomb binarization method, a limited K-th order Exp_Golomb binarization method, a fixed-length binarization method, a unary binarization method, or a truncated unary binarization method, etc. may be used.

When entropy encoding/decoding information on motion compensation, a context model may be determined by using at least one piece of information on motion compensation of a neighbor block adjacent to the current block or area information of the neighbor block, information on previously encoded/decoded motion compensation or previously encoded/decoded area information, information on the depth of the current block, and information on the size of the current block.

Also, when entropy encoding/decoding information on motion compensation, entropy encoding/decoding may be performed by using at least one piece of information on motion compensation of the neighbor block, information on previously encoded/decoded motion compensation, information on the depth of the current block, and the information on the size of the current block as a prediction value for information on motion compensation of the current block.

The encoding/decoding process may be performed for each of luma and chroma signals. For example, in the encoding/decoding process, at least one method of obtaining an inter-prediction indicator, generating a merge candidate list, deriving motion information, and performing motion compensation may be differently applied for a luma signal and a chroma signal.

The encoding/decoding process may be equally performed for luma and chroma signals. For example, in the encoding/decoding process being applied for the luma signal, at least one of an inter-prediction indicator, a merge candidate list, a merge candidate, a reference picture, and a reference picture list may be equally applied to the chroma signal.

The methods may be performed in the encoder and the decoder in the same manner. For example, in the encoding/decoding process, at least one method of obtaining an inter-prediction indicator, generating a merge candidate list, deriving motion information, and performing motion compensation may be applied to the encoder and the decoder equally. Also, orders of applying the methods may be different in the encoder and the decoder.

The embodiments of the present invention may be applied according to the size of at least one of the coding block, the prediction block, the block, and the unit. Here, the size may be defined as the minimum size and/or the maximum size in order to apply the embodiments, and may be defined as a fixed size to which the embodiment is applied. Also, a first embodiment may be applied in a first size, and a second embodiment may be applied in a second size. That is, the embodiments may be multiply applied according to the size. Also, the embodiments of the present invention may be applied only when the size is equal to or greater than the minimum size and is equal to or less than the maximum size. That is, the embodiments may be applied only when the block size is in a predetermined range.

For example, only when the size of the encoding/decoding target block is equal to or greater than 8×8, the embodiments may be applied. For example, only when the size of the encoding/decoding target block is equal to or greater than 16×16, the embodiments may be applied. For example, only when the size of the encoding/decoding target block is equal to or greater than 32×32, the embodiments may be applied. For example, only when the size of the encoding/decoding target block is equal to or greater than 64×64, the embodiments may be applied. For example, only when the size of the encoding/decoding target block is equal to or greater than 128×128, the embodiments may be applied. For example, only when the size of the encoding/decoding target block is 4×4, the embodiments may be applied. For example, only when the size of the encoding/decoding target block is equal to or less than 8×8, the embodiments may be applied. For example, only when the size of the encoding/decoding target block is equal to or less than 16×16, the embodiments may be applied. For example, only when the size of the encoding/decoding target block is equal to or greater than 8×8 and is equal to or less than 16×16, the embodiments may be applied. For example, only when the size of the encoding/decoding target block is equal to or greater than 16×16 and is equal to or less than 64×64, the embodiments may be applied.

The embodiments of the present invention may be applied according to a temporal layer. An identifier for identifying the temporal layer to which the embodiment can be applied may be signaled, and the embodiments may be applied for the temporal layer specified by the identifier. Here, the identifier may be defined as indicating the minimum layer and/or the maximum layer to which the embodiment can be applied, and may be defined as indicating a particular layer to which the embodiment can be applied.

For example, only when the temporal layer of the current picture is the lowest layer, the embodiments may be applied. For example, only when a temporal layer identifier of the current picture is zero, the embodiments may be applied. For example, only when the temporal layer identifier of the current picture is equal to or greater than one, the embodiments may be applied. For example, only when the temporal layer of the current picture is the highest layer, the embodiments may be applied.

As described in the embodiment of the present invention, a reference picture set used in processes of reference picture list construction and reference picture list modification may use at least one of reference picture lists L0, L1, L2, and L3.

According to the embodiments of the present invention, when a deblocking filter calculates boundary strength, at least one to at most N motion vectors of the encoding/decoding target block may be used. Here, N indicates a positive integer equal to or greater than 1 such as 2, 3, 4, etc.

In motion vector prediction, when the motion vector has at least one of a 16-pixel (16-pel) unit, a 8-pixel (8-pel) unit, a 4-pixel (4-pel) unit, an integer-pixel (integer-pel) unit, a 1/2-pixel (1/2-pel) unit, a 1/4-pixel (1/4-pel) unit, a 1/8-pixel (1/8-pel) unit, a 1/16-pixel (1/16-pel) unit, a 1/32-pixel (1/32-pel) unit, and a 1/64-pixel (1/64-pel) unit, the embodiments of the present invention may be applied. Also, in performing the merge mode, the motion vector may be optionally used for each pixel unit.

A slice type to which the embodiments of the present invention may be defined and the embodiments of the present invention may be applied according to the slice type.

For example, when the slice type is a T (Tri-predictive)-slice, a prediction block may be generated by using at least three motion vectors, and may be used as the final prediction block of the encoding/decoding target block by calculating a weighted sum of at least three prediction blocks. For example, when the slice type is a Q (Quad-predictive)-slice, a prediction block may be generated by using at least four motion vectors, and may be used as the final prediction block of the encoding/decoding target block by calculating a weighted sum of at least four prediction blocks.

The embodiment of the present invention may be applied to inter prediction and motion compensation methods using the merge mode, as well as inter prediction and motion compensation methods using motion vector prediction, and inter prediction and motion compensation methods using the skip mode, etc.

The shape of the block to which the embodiments of the present invention is applied may have a square shape or a non-square shape.

A method for encoding and decoding a video by using a merge mode according to the present invention have been described above with reference to FIGS. 12 to 32. Hereinafter, a method for decoding a video, a method for encoding a video, an apparatus for decoding a video, an apparatus for encoding a video, and a bitstream according to the present invention will be described in detail with reference to FIGS. 33 and 34.

Figure 33:
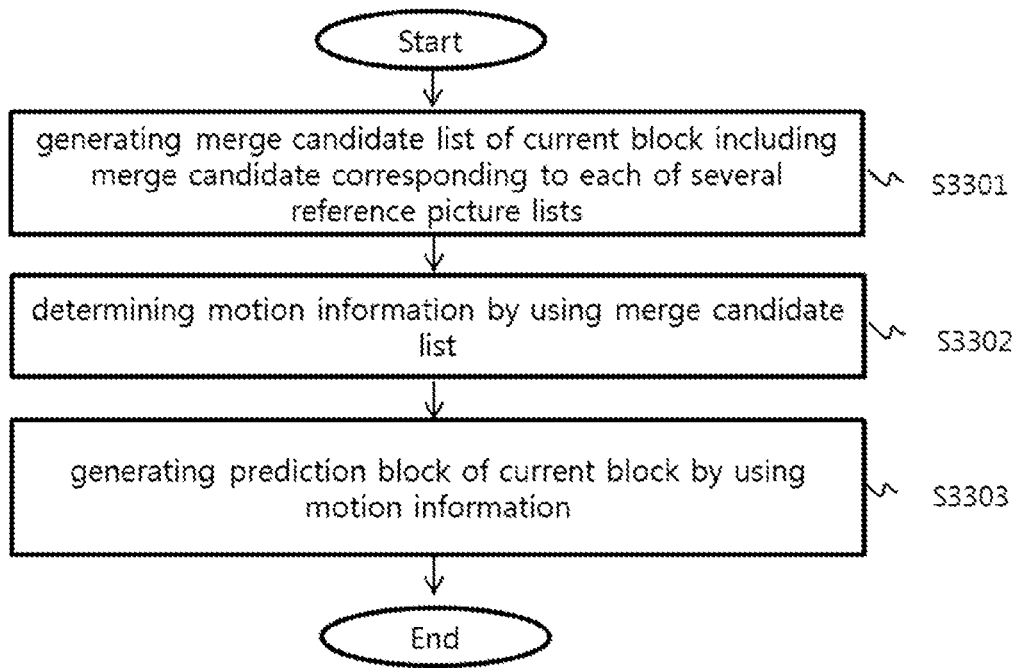
FIG. 33 is a view showing a method for decoding a video according to the present invention.

FIG. 33 is a view showing a method for decoding a video according to the present invention.

Referring to FIG. 33, a merge candidate list of a current block including at least one merge candidate corresponding to each of a plurality of reference picture lists may be generated at step S3301.

Here, the merge candidate corresponding to each of the plurality of reference picture lists may mean a merge candidate having LX motion information corresponding to reference picture list LX. For example, there are L0 merge candidate having L0 motion information, L1 merge candidate having L1 motion information, L2 merge candidate having L2 motion information, L3 merge candidate having L3 motion information, etc.

In the meantime, the merge candidate list includes at least one of a spatial merge candidate derived from a spatial neighbor block of the current block, a temporal merge candidate derived from a collocated block of the current block, a modified spatial merge candidate derived by modifying the spatial merge candidate, a modified temporal merge candidate derived by modifying the temporal merge candidate, and a merge candidate having a predefined motion information value. Here, the merge candidate having the predefined motion information value may be a zero merge candidate.

In this case, the spatial merge candidate may be derived from a sub-block of a neighbor block adjacent to the current block. Also, the temporal merge candidate may be derived from a sub-block of the collocated block of the current block.

In the meantime, the merge candidate list may further include a combined merge candidate derived by using at least two selected from the group consisting of the spatial merge candidate, the temporal merge candidate, the modified spatial merge candidate, and the modified temporal merge candidate.

Also, at least one piece of motion information may be determined by using the generated merge candidate list at step S3302.

Also, the prediction block of the current block may be generated by using the determined at least one piece of motion information at step S3303.

Here, the generating of the prediction block of the current block at step S3303 may include: generating a plurality of temporary prediction blocks according to an inter-prediction indicator of the current block; and generating the prediction block of the current block by applying at least one of a weighting factor and an offset to the generated plurality of temporary prediction blocks.

In this case, at least one of the weighting factor and the offset may be shared in blocks that are smaller than a predetermined block in size or are deeper than the predetermined block in depth.

In the meantime, the merge candidate list may be shared in blocks that are smaller than a predetermined block in size or are deeper than the predetermined block in depth.

Also, when the current block is smaller than a predetermined block in size or is deeper than the predetermined block in depth, the merge candidate list may be generated based on a high block of the current block. The higher bock is equal to the predetermined block in size or in depth.

The prediction block of the current block may be generated by applying information on a weighted sum to a plurality of prediction blocks generated based on a plurality of merge candidates or a plurality of merge candidate lists.

Figure 34:
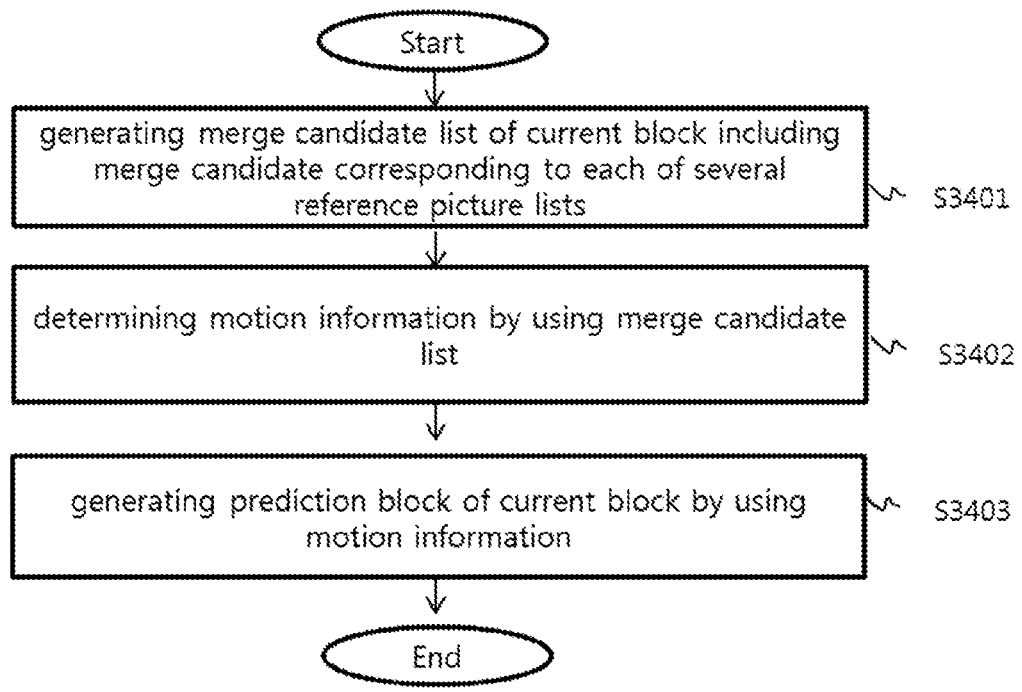
FIG. 34 is a view showing a method for encoding a video according to the present invention.

FIG. 34 is a view showing a method for encoding a video according to the present invention.

Referring to FIG. 34, a merge candidate list of a current block including at least one merge candidate corresponding to each of a plurality of reference picture lists may be generated at step S3401.

At least one piece of motion information may be determined by using the generated merge candidate list at step S3402.

Also, a prediction block of the current block may be generated by using the determined at least one piece of motion information at step S3403.

An apparatus for decoding a video according to the present invention may include an inter prediction unit that generates a merge candidate list of a current block including at least one merge candidate corresponding to each of a plurality of reference picture lists, determines at least one piece of motion information by using the merge candidate list, and generates a prediction block of the current block by using the determined at least one piece of motion information.

An apparatus for encoding a video according to the present invention may include an inter prediction unit that generates a merge candidate list of a current block including at least one merge candidate corresponding to each of a plurality of reference picture lists, determines at least one piece of motion information by using the merge candidate list, and generates a prediction block of the current block by using the determined at least one piece of motion information.

A bitstream according to the present invention may be a bitstream generated by a method for encoding a video, the method including: generating a merge candidate list of a current block including at least one merge candidate corresponding to each of a plurality of reference picture lists; determining at least one piece of motion information by using the merge candidate list; and generating a prediction block of the current block by using the determined at least one piece of motion information.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:

1. A method for decoding a video, the method comprising:
generating a merge candidate list of a current block including at least one merge candidate;
determining motion information of the current block by using the merge candidate list;
generating a plurality of temporary prediction blocks based on the motion information of the current block;
generating a prediction block of the current block by applying a weighting factor and an offset to the generated plurality of temporary prediction blocks;
generating a residual block of the current block by inverse-transform and inverse-quantization; and
generating a reconstructing block of the current block based on the prediction block and the residual block,
wherein the weighting factor is derived by index information for specifying a weight factor applied to the current block among weight factors included in a predefined weighting factor set, and
wherein the index information is derived from index information of neighboring blocks of the current block for specifying the weight factor applied to the current block.

2. The method of claim 1, wherein the merge candidate list includes at least one of a spatial merge candidate derived from a spatial neighbor block of the current block and a temporal merge candidate derived from a collocated block of the current block, and
wherein the temporal merge candidate is derived from a sub-block of the collocated block of the current block.

3. The method of claim 1, wherein the predefined weighting factor set comprises a positive weighting factor and a negative weighting factor.

4. The method of claim 1, wherein the merge candidate list is shared in blocks that are smaller than a predetermined block in size or are deeper than the predetermined block in depth.

5. The method of claim 1, wherein when the current block is smaller than a predetermined block in size or is deeper than the predetermined block in depth, the merge candidate list is generated based on a higher block of the current block, the higher block being equal to the predetermined block in size or in depth.

6. A method for encoding a video, the method comprising:
generating a merge candidate list of a current block including at least one merge candidate;
determining motion information of the current block by using the merge candidate list;
generating a plurality of temporary prediction blocks based on the motion information of the current block;
generating a prediction block of the current block by applying a weighting factor and an offset to the generated plurality of temporary prediction blocks; and
generating a residual block of the current block based on the current block and the prediction block,
wherein the weighting factor is derived by index information for specifying a weight factor applied to the current block among weight factors included in a predefined weighting factor set, and
wherein the index information is derived from index information of neighboring blocks of the current block for specifying the weight factor applied to the current block.

7. The method of claim 6, wherein the merge candidate list includes at least one of a spatial merge candidate derived from a spatial neighbor block of the current block and a temporal merge candidate derived from a collocated block of the current block, and
wherein the temporal merge candidate is derived from a sub-block of the collocated block of the current block.

8. The method of claim 6, wherein the predefined weighting factor set comprises a positive weighting factor and a negative weighting factor.

9. The method of claim 6, wherein the merge candidate list is shared in blocks that are smaller than a predetermined block in size or are deeper than the predetermined block in depth.

10. The method of claim 6, wherein when the current block is smaller than a predetermined block in size or is deeper than the predetermined block in depth, the merge candidate list is generated based on a higher block of the current block, the higher block being equal to the predetermined block in size or in depth.

11. A non-transitory computer readable medium storing a bitstream formed by a method for encoding a video, wherein the method comprises:
generating a merge candidate list of a current block including at least one merge candidate;
determining motion information of the current block by using the merge candidate list;
generating a plurality of temporary prediction blocks based on the motion information of the current block;
generating a prediction block of the current block by applying a weighting factor and an offset to the generated plurality of temporary prediction blocks; and
generating a residual block of the current block based on the current block and the prediction block,
wherein the weighting factor is derived by index information for specifying a weight factor applied to the current block among weight factors included in a predefined weighting factor set, and
wherein the index information is derived from index information of neighboring blocks of the current block for specifying the weight factor applied to the current block.

* * * * *